United States Patent [19]
Marutani et al.

[11] Patent Number: 5,786,435
[45] Date of Patent: Jul. 28, 1998

[54] LOW SOLVENT COMPOSITION OF ALICYCLIC EPOXY OLIGOMER

[75] Inventors: Yoshiaki Marutani; Tadamitsu Nakahama; Shinji Sasaki; Hiroyuki Uemura; Kazuhi Koga; Takashi Tomita; Mika Ohsawa, all of Hiroshima-Ken, Japan

[73] Assignee: Mazda Motor Corporation, Hiroshima, Japan

[21] Appl. No.: 926,995

[22] Filed: Sep. 10, 1997

Related U.S. Application Data

[63] Continuation of Ser. No. 728,264, Oct. 8, 1996, abandoned, which is a continuation of Ser. No. 331,598, filed as PCT/JP94/00456 Mar. 22, 1994, abandoned.

[30] Foreign Application Priority Data

Mar. 19, 1993 [JP] Japan ................... 5-060401
Mar. 19, 1993 [JP] Japan ................... 5-060402

[51] Int. Cl.$^6$ ............... C08F 120/32; C08K 5/01; C08L 33/14
[52] U.S. Cl. ............... 526/273; 523/400; 523/439; 523/456; 525/208
[58] Field of Search ............ 526/273; 525/208; 523/400, 439, 456

[56] References Cited

U.S. PATENT DOCUMENTS

| | | | |
|---|---|---|---|
| 4,923,945 | 5/1990 | Isozaki et al. | 528/16 |
| 4,927,884 | 5/1990 | Iwasawa et al. | 525/195 |
| 4,972,027 | 11/1990 | Isozaki et al. | 525/365 |
| 5,026,793 | 6/1991 | Nakai et al. | 525/476 |
| 5,051,473 | 9/1991 | Tabuchi et al. | 525/100 |
| 5,096,936 | 3/1992 | Seko et al. | 526/268 |
| 5,166,265 | 11/1992 | Nakahata et al. | 525/101 |

FOREIGN PATENT DOCUMENTS

| | | |
|---|---|---|
| 58-108259 | 6/1983 | Japan. |
| 1-123814 | 5/1989 | Japan. |
| 1-123817 | 5/1989 | Japan. |
| 1-129018 | 5/1989 | Japan. |
| 1-129019 | 5/1989 | Japan. |
| 1-131203 | 5/1989 | Japan. |
| 1-131276 | 5/1989 | Japan. |
| 2-73825 | 3/1990 | Japan. |
| 2-180921 | 7/1990 | Japan. |
| 2-228320 | 9/1990 | Japan. |
| 2-232221 | 9/1990 | Japan. |
| 2-232251 | 9/1990 | Japan. |
| 2-233717 | 9/1990 | Japan. |
| 2-251521 | 10/1990 | Japan. |
| 2-289611 | 11/1990 | Japan. |
| 4-57819 | 2/1992 | Japan. |
| 4-57820 | 2/1992 | Japan. |
| 4-72324 | 3/1992 | Japan. |
| 4-81419 | 3/1992 | Japan. |
| 4-180951 | 6/1992 | Japan. |
| 4-180952 | 6/1992 | Japan. |
| 4-218561 | 8/1992 | Japan. |
| 4-325579 | 11/1992 | Japan. |
| 5-59289 | 3/1993 | Japan. |
| 5-97771 | 4/1993 | Japan. |
| 5-97975 | 4/1993 | Japan. |

Primary Examiner—Robert E. Sellers
Attorney, Agent, or Firm—Martin Fleit

[57] ABSTRACT

The present invention relates to a low solvent content-type resin composition, a low solvent content-type coating composition containing such a resin composition as a binder, and a method for coating such a coating composition. The resin composition comprises an oligomer containing an alicyclic epoxy group in a molecule and having a number average molecular weight (Mn) of 300 to 2000, a weight average molecular weight (Mw) of 300 to 4000 and an Mw/Mn ratio of 1 to 2.5. The coating composition comprises such a resin composition and a cationic polymerization catalyst, wherein the content of an organic solvent content is 0 to 40 wt. %. Since the present composition contains a low molecular weight oligomer, the viscosity of the composition is low even though the solid content is high. Accordingly, the content of the organic solvent can be much reduced.

28 Claims, No Drawings

LOW SOLVENT COMPOSITION OF ALICYCLIC EPOXY OLIGOMER

This is a continuation of Application. Ser. No. 08/728, 264, filed Oct. 8, 1996, abandoned, which is a continuation of Application. Ser. No. 08/331,598, filed Nov. 4, 1994, abandoned, which is the U.S. National Phase of International Application. Ser. No. PCT/JP94/00456, filed Mar. 22, 1994.

TECHNICAL FIELD

The present invention relates to a low solvent content type-resin composition, a coating composition containing such resin composition as a binder, and a process for coating such coating composition. In particular, the present invention relates to a low solvent content type-resin composition which provides improved coating characteristics, such as improved coating appearance, water resistance, chipping resistance, alkali resistance, weathering resistance, scuff resistance and gasoline resistance and wherein the content of an organic solvent to be used can be reduced to 40% or lower, preferably to 35% or lower, much preferably to 30% or lower, and the coating composition containing such resin composition, as well as the process for coating such coating composition.

BACKGROUND OF INVENTION

Recently, strict regulations have been imposed on the discharge of the organic solvents from the coating compositions containing such organic solvents, in order to prevent the pollution of the atmosphere by the evaporation of the solvents. Accordingly, there have been widely investigated various coating compositions such as aqueous coating compositions which do not use any organic solvents or do not substantially use the organic solvents, powder coating compositions, and ultraviolet-curable coating compositions. However, there have been no satisfactory coating compositions available so far.

At present, the organic solvent-type coating compositions have been intensively studied for the purposes of making the solvent content much lower.

For example, Japanese Patent Unexamined Publication (hereinafter referred to as "Kokai") No. 58-108259 discloses a high solid content coating composition comprising alkoxy melamine resin, a polyol or oligomer having a specific hydoxyl value and an acid catayst, at a specific proportion, so as to make the molecular weight smaller, whereby increasing the solid resin content when the coating composition is coated, while reducing the amount of the organic solvent to be used in the coating composition. However, in order to supplement the insufficiency of curing which is caused by the lowered molecular weight of the oligomer, the amount of a hydroxyl group must be increased. Since the hydroxyl group has a strong polarity, it is difficult to reduce the viscosity. In addition, when resin having a high hydroxyl value is cured with melamine resin, the performances of the resultant coating, such as acid resistance, etc. were much reduced.

SUMMARY

The present invention is to provide a low solvent content type-resin composition. Also, the present invention is to provide a low solvent content type-coating composition containing such low solvent content type-resin composition as a binder. The present invention is also to provide a process for coating the low solvent content type-coating composition. Further, the present invention is to provide a low solvent content type-coating composition wherein the amount of the organic solvent can be reduced to 40% or lower, preferably to 35% or lower, much preferably to 30% or lower, the coating composition providing improved coating properties of the resultant coating such as improved coating appearance, water resistance, chipping resistance, alkali resistance, weathering resistance, scuff resistance and gasoline resistance.

The present inventors have made intensive studies in order to achieve the above objectives and, as a result, have found that, when an oligomer having at least one alicyclic epoxy group per molecule, a number average molecular weight (Mn) of 300 to 2000, a weight average molecular weight (Mw) of 300 to 4000, and a ratio of a weight average molecular weight/a number average molecular weight (Mw/Mn) of 1 to 2.5 is combined with a cationic polymerization catalyst, the above objectives can be attained. The present invention has been completed on the basis of this finding.

The present invention will be explained in detail below.

DISCLOSURE OF INVENTION

The oligomer used in the present invention and having at least one alicyclic epoxy group per molecule is an oligomer having a number average molecular weight (Mn) of 300 to 2000, a weight average molecular weight (Mw) of 300 to 4000, and a ratio of a weight average molecular weight/a number average molecular weight (Mw/Mn) of 1 to 2.5. When the Mn of the oligomer is lower than 300, the coating ability is decreased and the resultant coating has low coating strength, gasoline resistance and scuff resistance. On the other hand, when the Mn of the oligomer is higher than 2000, the viscosity of the coating composition becomes too large and, especially in case where the oligomer is a vinyl oligomer such as acrylic oligomers, the number of a functional group per molecule becomes relatively small, so that molecules which do not enter into the cross-linking reaction are generated. Therefore, the coating properties of the resultant coating such as gasoline resistance and scuff resistance are decreased. The Mn of the oligomer is preferably 600 to 2000 and much preferably is 700 to 1800. As stated below, the basic backbone of the present oligomer is, for example, vinyl oligomers such as acrylic oligomers and polyester oligomers. In case where the oligomer is acrylic oligomers, when the molecular weight thereof is small, it is difficult to introduce a suitable amount of a functional group into one molecule. Accordingly, when the oligomer having a very low molecular weight is used, the degree of cross-linking is easily decreased and the coating easily becomes brittle. In case of a polyester oligomer, it is relatively easy to introduce a prescribed amount of a functional group into the oligomer even if the molecular weight of the oligomer is small. Accordingly, the polyester oligomers having a low molecular weight can be preferably used, as compared with the acrylic oligomers. Therefore, the number average molecular weight of the acrylic oligomer is preferably 600 or higher. In case of a polyester oligomer, it can be used without causing any problem, so long as the molecular weight of the polyester oligomer is 300 or higher.

In case of acrylic oligomers, the number average molecular weight is preferably 600 to 1800, in particular 700 to 1500. On the other hand, in case of polyester oligomers, the number average molecular weight is preferably 300 to 1800, in particular, 400 to 1500.

Depending on the number average molecular weight of the oligomer, the weight average molecular weight of the oligomer is 300 to 4000. The weight average molecular weight of the oligomer is preferably 600 to 3000, much preferably 700 to 2000. In case where the oligomer is an acrylic oligomer, the weight average molecular weight is preferably 600 to 3000, much preferably 700 to 2000. In case where the oligomer is a polyester oligomer, the weight average molecular weight is preferably 300 to 3000.

When the ratio of a weight average molecular weight/a number average molecular weight of the oligomer (Mw/Mn) is larger than 2.5, the amounts of the oligomers having a too large molecular weight and oligomers having a too small molecular weight become relatively larger. Accordingly, there appear the same problems which are caused by the oligomers having a larger molecular weight or a smaller molecular weight. The ratio of a weight average molecular weight/a number average molecular weight of the oligomer is preferably 2.0 or less, much preferably 1.8 or less. In this connection, the ratio should be theoretically 1. The smaller the molecular weight of the oligomer, the easier the ratio becomes closer to the theoretical value.

As a backbone of the present oligomer, various backbones can be used. For example, the backbones may be vinyl oligomers such as acrylic oligomers (the oligomers produced by the polymerization of acrylic monomers are especially called acrylic oligomers), polyester oligomers having a polyester backbone, polyurethane oligomers having a polyurethane backbone, silicone oligomers having a siloxy backbone, polyamide oligomers having a polyamide backbone, etc. The preferred backbone is vinyl oligomers and polyester oligomers, since they can be easily produced and they are economically advantageous. The vinyl oligomers are preferably acrylic oligomers.

The alicyclic epoxy group essential to the present oligomer is an epoxy group wherein an oxygen atom is bound to the two adjacent carbon atoms of the five or six-membered alicyclic ring (including bridged carbon-containing hydrocarbons).

The oligomer used in the present invention has at least one alicyclic epoxy group per molecule. When the oligomer is used in the coating composition as a binder, the alicyclic epoxy group cleaves with the cationic polymerization catalyst to open the epoxy ring and the polymerization reaction proceeds. In this case, the alicyclic epoxy group produces a hydroxyl group when the opening of the ring. The cross-linking reaction proceeds as the reaction between a hydroxyl group and an epoxy group, to form a cross-linked coating structure. In this connection, as stated below, the present oligomers may have a functional group selected from the group consisting of a silanol group, a hydrolyzable silyl group, a hydroxyl group and a blocked hydroxyl group, together with an alicyclic epoxy group. Also, the present oligomers can be used together with oligomers only having such optional functional group. If such optional functional groups are present in the low solvent content type-resin composition, additional complicated reactions occur together with the reaction between the hydroxyl group and the epoxy group.

The number of an alicyclic epoxy group per one molecule of the present oligomers is preferably 2 to 5, much preferably 2 to 4. When the number is less than 2, the coating strength is decreased. When the number is more than 5, the viscosity becomes too large and the coating is brittle.

While the present oligomer must have an alicyclic epoxy group as a functional group, it may also have an optional functional group selected from the group consisting of a silanol group, a group which produces a silanol group when it is hydrolyzed (hereinafter referred to as "a hydrolyzable silyl group" or "blocked silyl group"), a hydorxyl group and a blocked hydroxyl group. The silanol group reacts with a hydroxyl group to form an Si—O bond. The hydrolyzable silyl group generates a silanol group in the presence of water in the atmospere or water. The silanol group reacts with a hydroxyl group in the same manner as the above, to form cross-linking via an Si—O bond.

More specifically, the silanol group reacts with a hydroxyl group produced from the ring opening reaction of the alicyclic epoxy group, to form an Si—O bond and produces cross-linking constituted of the Si—O bond. Also, the reaction occurs among the silanol groups, to form an Si—O—Si bond.

The presence of the Si—O bond and Si—O—Si bond makes the coating highly strong and flexible.

In case where the silanol group acts as a catalyst, it is necessary to use an organometallic compound. The organometallic compound reacts with the silanol group, to form the following bond.

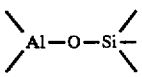

Then, this bond coordinates the silanol group, to form the following bond and separate the silanol group.

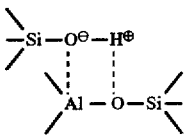

The separated silanol group causes the cationic polymerization of the alicyclic epoxy group and the reaction between the alicyclic epoxy group and a hydroxyl group.

When a hydroxyl group is introduced into the resin, the brittleness of the coating is improved. The blocked hydroxyl group releases a blocking group and a hydroxyl group with the action of a catalyst.

The hydroxyl group reacts with an alicyclic epoxy group as well as a silanol group and the silanol group produced from the hydrolysis of the hydrolyzable silyl group, to form cross-linking constituted of a siloxy group and ether group.

In this connection, when the silanol group and a hydroxyl group are blocked with a blocking agent, the polarity of these functional groups is reduced and therefore, a low viscosity coating composition is obtained even if the solvent amount is lowered.

The combinations of the functional groups incorporated into one molecule of the oligomer include:

(1) combination of an alicyclic epoxy group with a silanol group;

(2) combination of an alicyclic epoxy group with a hydrolyzable silyl group;

(3) combination of an alicyclic epoxy group with a silanol group and a hydrolyzable silyl group;

(4) combination of an alicyclic epoxy group with a hydroxyl group;

(5) combination of an alicyclic epoxy group with a blocked hydroxyl group;

(6) combination of an alicyclic epoxy group with a hydroxyl group and a blocked hydroxyl group;

(7) combination of an alicyclic epoxy group with a silanol group, a hydrolyzable silyl group and a hydroxyl group;

(8) combination of an alicyclic epoxy group with a silanol group, a hydrolyzable silyl group and a blocked hydroxyl group; and (9) combination of an alicyclic epoxy group with a silanol group, a hydrolyzable silyl group, a hydroxyl group and a blocked hydroxyl group.

The amount ratio (in respect of mole/Kg resin) per oligomer molecule between the alicyclic epoxy group and the optional functional group selected from the group consisting of a silanol group, a hydrolyzable silyl group, a hydroxyl group and a blocked hydroxyl group is suitably 0.1 to 100:1, preferably 0.5 to 100:1, much preferably 1 to 100:1. Especially, when excessive hydroxyl group is introduced into the oligomer, the acid resistance of the resultant coating is decreased. Accordingly, it is preferable that the amount of the hydroxyl group should be the molar number of the alicyclic epoxy group or less.

The total number of the functional groups in the present oligomer molecule is 1 to 15 mol/Kg resin, preferably 2 to 5 mol/Kg resin, much preferably 3 to 4 mol/Kg resin. In case where the oligomer is an acrylic oligomer, the total number is preferably 2 to 5 mol/Kg resin, much preferably 3 to 4 mol/Kg resin. When the total number is less than 2 mol/Kg resin, the cross-linking density becomes small. Accordingly, the strength and flexiblity of the resultant coating are decreased and therefore the coating properties such as impact resistance, scuff resistance, gasoline resistance and chipping resistance are deteriorated. On the other hand, when the total number is more than 5 mol/Kg resin, the cross-linking density becomes too large and the resultant coating becomes brittle. Therefore, the coating properties are much deteriorated. In this connection, when the total number is selected, it is necessary to consider the relation between the total number and the molecular weight of the oligomer. More specifically, when the molecular weight of the oligomer is large, the degree of cross-linking becomes too small unless the total number is increased and, therefore, the sufficient coating properties cannot be obtained. In case where the molecular weight of the oligomer is small and the total number is too large, the degree of cross-linking is too large and, therefore, the coating becomes brittle and the good coating properties cannot be obtained. However, the suitable combination of the molecular weight and the total number can be experimentally determined by a person skilled in the art.

The glass transition temperature (Tg) of the oligomer is preferably −35° to 40° C., much preferably −10° to 30° C. When Tg is lower than −35° C., the flexibility of the coating becomes lower and, therefore, the coating is brittle at a lower temperature. When Tg is higher than 40° C., the coating becomes too soft and, therefore, the gasoline resistance of the coating becomes lower.

The Mn, Mw and Mw/Mn of the oligomers having an optional functional group selected from the group consisting of a silanol group, a hydrolyzable silyl group, a hydroxyl group and a blocked hydroxyl group, together with an alicyclic epoxy group are within the ranges of the Mn, Mw and Mw/Mn as stated above.

In this connection, the oligomer having an alicyclic epoxy group as well as a silanol group or a hydrolyzable silyl group is preferably an oligomer having Mn of 600–2000, Mw of 600–4000 and Mw/Mn of 2.5 or less. The oligomer having an alicyclic epoxy group as well as a hydroxyl group or a blocked hydroxyl group is preferably an oligomer having Mn of 600–1800, Mw of 600–3000 and Mw/Mn of 2 or less.

The oligomer having an alicyclic epoxy group as well as a silanol group or a hydrolyzable silyl group and a hydroxyl group or a blocked hydroxyl group is preferably an oligomer having Mn of 600–2000, Mw of 600–4000 and Mw/Mn of 2.5 or less.

Further, the present oligomer may be used together with the oligomers which do not have any alicyclic epoxy group but have an optional functional group selected from the group consisting of a silanol group, a hydrolyzable silyl group, a hydroxyl group and a blocked hydroxyl group, or a combination thereof.

The oligomers which do not have any alicyclic epoxy group but have a silanol group or a hydrolyzable silyl group are preferably acrylic oligomers having an Mn of 600–3000, preferably 600–2000, an Mw of 600–6000, preferably 600–4000, and an Mw/Mn of 2.5 or less, preferably 2.0 or less. The oligomers which do not have any alicyclic epoxy group but have a hydroxyl group or a blocked hydroxyl group are preferably acrylic oligomers having an Mn of 600–1800, preferably 700–1500, an Mw of 600–3000, preferably 700–2000, and an Mw/Mn of 2.5 or less, preferably 2.0 or less. The oligomers which do not have any alicyclic epoxy group but have a silanol group or a hydrolyzable silyl group and a hydroxyl group or a blocked hydroxyl group are preferably acrylic oligomers having an Mn of 600–3000, preferably 700–2000, an Mw of 600–6000, preferably 700–3000, and an Mw/Mn of 2.5 or less, preferably 2.0 or less.

The oligomer having an alicyclic epoxy group can be prepared by the polymerization of monomers having an alicyclic epoxy group. The polymerization of the monomers can be carried out by the conventional methods. For example, the polymerization can be carried out by ionic polymerization such as anionic polymerization and cationic polymerization, or radical polymerization. Among these polymerization methods, the radical polymerization is preferred for the present oligomers, since the oligomers having an alicyclic epoxy group can be easily prepared. In this connection, since the oligomers having a lower molecular weight must be prepared for the present invention, it is preferable, for example, that mercaptans such as mercaptoethanol, thioglycerol and lauryl mercaptan or chain transfer agents should be used in the polymerization, or that the polymerization should be carried out at a low temperature such as 140°–180° C., or that the monomer concentration should be lowered.

The radical polymerization should be preferably carried out in solutions. The solvents used for such polymerization may be any solvents conventionally used for the radical polymerization of acrylic monomers in solutions. The solvents include xylene, solvesso 100 (manufactured by Exxon) and butyl acetate.

The radical initiator used for the radical solution polymerization may be any initiators conventionally used for the radical polymerization. The initiator includes oxides such as benzoyl peroxide, lauroyl peroxide, t-butyl hydroperoxide and t-butylperoxy-2-ethylhexanol, azo compounds such as azobis-isobutyronitrile, 2,2-azobis-valeronitrile and azobis (2-methypropiononitrile).

The monomers having an alicyclic epoxy group are preferably those monomers having an alicyclic epoxy group and a radically polymerizable unsaturated bond. The radically polymerizable unsaturated bond is preferably those listed below.

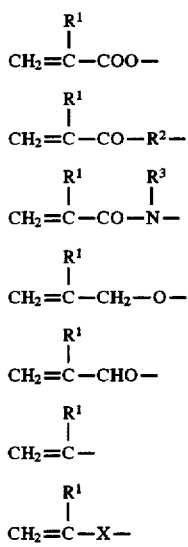

(1)
(2)
(3)
(4)
(5)
(6)
(7)

In the formulae, $R^1$ is a hydrogen atom or a methyl group; $R^2$ is a bivalent aliphatic hydrocarbon; $R^3$ is a hydrogen atom or an alkyl group having 1–10 carbon atoms; and X is a phenylene group.

The bivalent hydrocarbon group as $R^2$ includes an alkylene group, a cycloalkylene group and an arylene group. The alkylene group includes a linear or branched alkylene group such as methylene, ethylene, propylene, butylene, isobutylene and hexamethylene. The cycloalkylene group includes cyclopentylene and cyclohexylene. The arylene group includes o-, m- or p-phenylene, naphthalene and anthracene. $R^3$ includes methyl, ethyl, propyl, isopropyl, n-butyl, s-butyl, t-butyl and n-pentyl.

The examples of the monomers having the radically polymerizable unsaturated bond represented by the formula (1) are as follows:

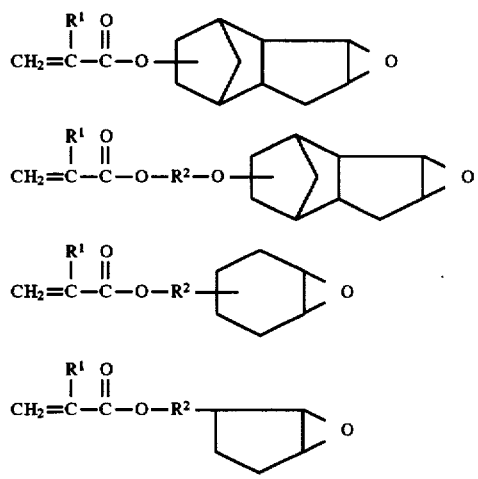

(8)
(9)
(10)
(11)

In the formula above, $R^1$ and $R^2$ are defined above.
The specific examples of such monomers are as follows:

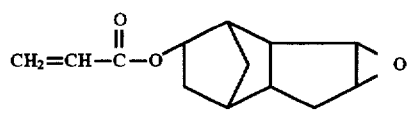

(12)

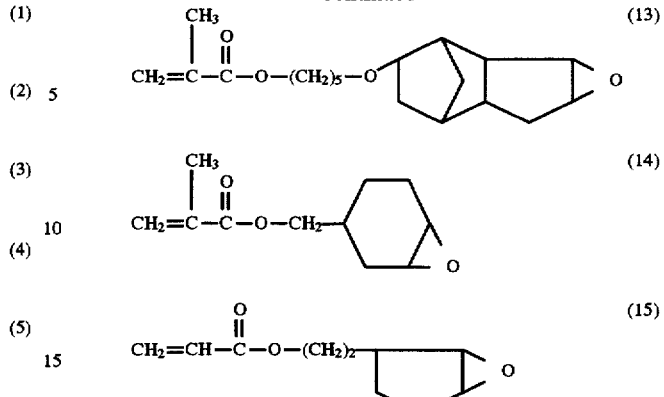

(13)
(14)
(15)

The examples of the monomers having the radically polymerizable unsaturated bond represented by the formula (2) are as follows:

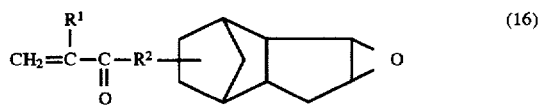

(16)

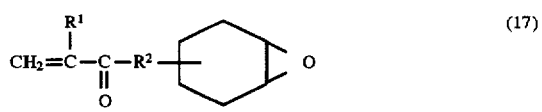

(17)

In the formulae above, $R^1$ and $R^2$ are defined above.

The specific examples of the monomers represented by the above formulae are as follows:

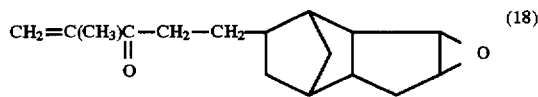

(18)

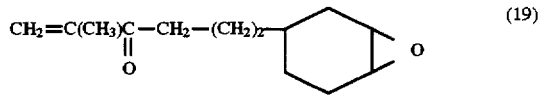

(19)

The examples of the monomers having the radically polymerizable unsaturated bond resented by the formula (3) are as follows:

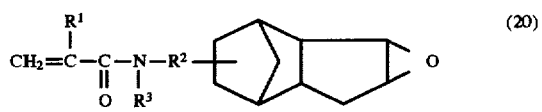

(20)

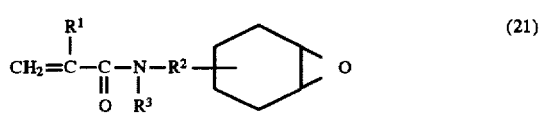

(21)

In the formulae above, $R^1$, $R^2$ and $R^3$ are defined above.

The specific examples of the monomers represented by the above formulae are as follows:

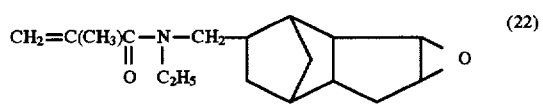

(22)

-continued

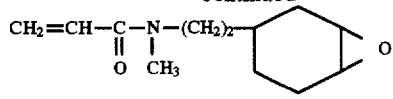 (23)

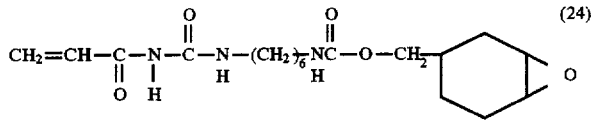 (24)

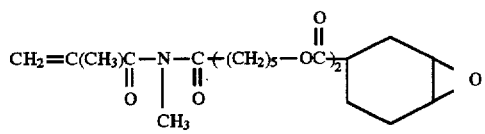 (25)

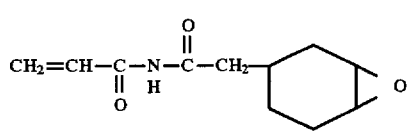 (26)

The examples of the monomers having the radically polymerizable unsaturated bond represented by the formula (4) are as follows:

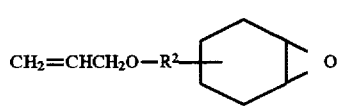 (27)

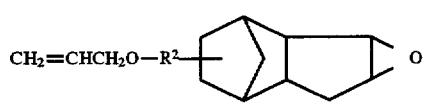 (28)

The specific examples of the monomers represented by the above formulae are as follows:

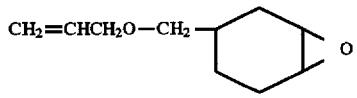 (29)

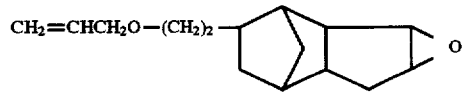 (30)

The examples of the monomers having the radically polymerizable unsaturated bond represented by the formula (5) are as follows:

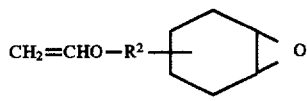 (31)

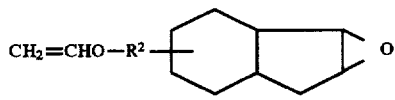 (32)

In the formulae above, $R^2$ is defined above.

The specific examples of the monomers represented by the above formulae are as follows:

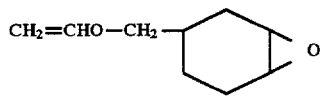 (33)

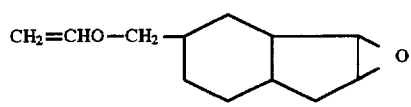 (34)

The examples of the monomers having the radically polymerizable unsaturated bond represented by the formula (6) are as follows:

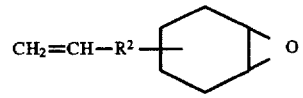 (35)

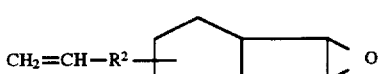 (36)

In the formulae above, $R^2$ is defined above.

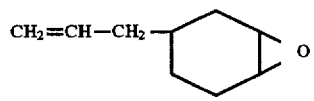 (37)

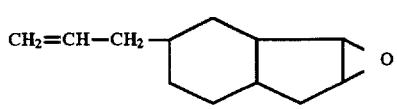 (38)

The examples of the monomers having the radically polymerizable unsaturated bond represented by the formula (7) are as follows:

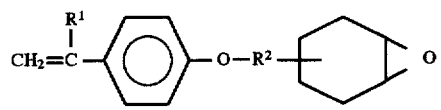 (39)

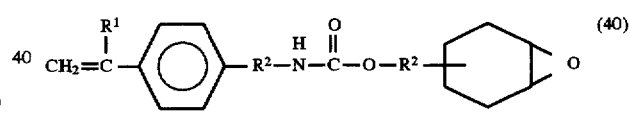 (40)

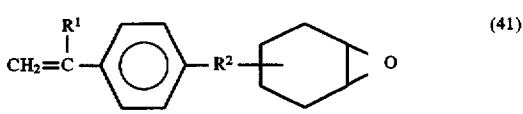 (41)

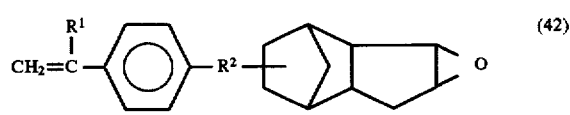 (42)

In the formulae above, $R^1$ and $R^2$ are defined above.

The specific examples of the monomers represented by the above formulae are as follows:

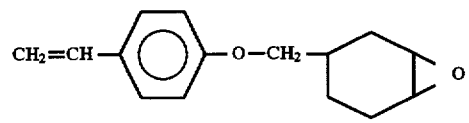 (43)

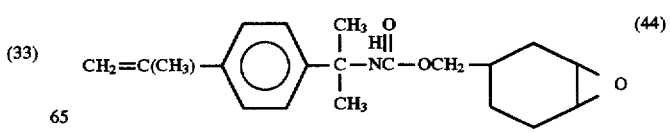 (44)

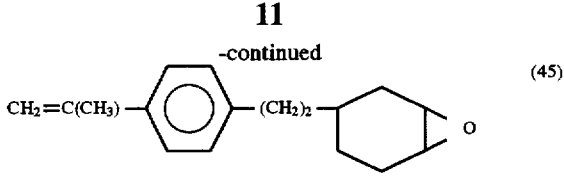

(45)

The present oligomers can be prepared by copolymerizing a monomer having an alicyclic epoxy group per molecule with an α, β-ethylenically unsaturated monomer. Such an α, β-ethylenically unsaturated monomer includes the following monomers:

(1) esters of acrylic or methacrylic acid;

For example, $C_{1-18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-18}$ alkoxy alkyl esters of acrylic or methacrylic acid, such as methoxybutyl acrylate, methoxybutyl methacrylate, methoxy ethyl acrylate, methoxy ethyl methacrylate, ethoxy butyl acrylate and ethoxy butyl methacrylate; $C_{2-8}$ alkenyl esters of acrylic or methacrylic acid, such as allyl acrylate and allyl methacrylate; $C_{3-18}$ alkenyloxyalkyl esters of acrylic or methacrylic acid, such as allyloxyethyl acrylate and allyloxyethyl methacrylate.

(2) vinyl aromatic compound;

For example, vinyl acetate, hexafluoropropylene, tetrafluoropropylene, styrene, α-methyl styrene, vinyltoluene and p-chlorostyrene.

(3) polyolefin compounds;

For example, butadiene, isoprene and chloroprene.

(4) allyl ethers;

For example, hydroxy ethyl allyl ether.

(5) others;

For example, methacrylamide, acrylamide, diacrylamide, dimethacrylamide, acylonitrile, methacrylonitrile, methyl isopropenyl ketone, vinyl acetate, vinyl propionate, vinyl pivalate, acrylic acid, methacrylic acid, N,N-dialkylaminoalkyl(meth)acrylate, phosphoric acid-containing (meth)acrylate such as phosphonoxyethyl (meth) acrylcate, perfluorovinyl ether such as trifluoromethyl vinyl ether, and vinyl ethers such as hydroxyethyl vinyl ether and hydroxybutyl vinyl ether.

The present oligomers having an alicyclic epoxy group can be prepared by esterifying or transesterifying monomers having an alicyclic epoxy group and a hydroxy group with monomers having a carboxylic acid or a blocked carboxylic acid, to carry out the polymerization. In this case, a polyester oligomer can be obtained.

The preferred monomers having an alicyclic epoxy group and a hydroxyl group in a molecule include the following monomers.

$$X—COO—R^1+OCO—R^2+_n OH \quad (46)$$

In the formula above, X is an alicyclic epoxy group, $R^1$ and $R^2$ are linear or branched alkylene groups having 1–10 carbon atoms, and n is 0–10.

The alkylene group includes methylene, ethylene, propylene, butylene, isobutylene and hexamethylene. n is preferably 0–8.

The specific monomers include the following monomers.

$$X—COO—CH_2—OH \quad (47)$$

$$X—COO—CH_2—OCO—(CH_2)_5—OH \quad (48)$$

As monomers having a carboxylic group, monobasic acid is usually used. Such monobasic acid includes a carboxylic acid having 1–20 carbon atoms. The preferred carboxylic acids are those having 4–12 carbon atoms. Such carboxylic acid includes acetic acid, propionic acid, caproic acid, and lauric acid. If it is necessary to incorporate a hydroxyl group into the present oligomers together with an alicyclic epoxy group, monomers having an alicyclic epoxy group and a hydroxyl group may be reacted with polybasic acids or their anhydrides, polyols, or lactones.

The polybasic acids or their anhydrides include aromatic polybasic acids or their anhydrides such as phthalic acid, phthalic anhydride, isophthalic acid, telephthalic acid, tetrahydro phthalic anhydride, hexahydro phthalic anhydride, methyl tetrahydro phthalic anhydride, methyl hexahydro phthalic anhydride, trimellitic anhydride; and aliphatic polybasic acids or their anhydrides such as maleic anhydride, succinic anhydride, fumaric anhydride, adipic anhydride, azelaic anhydride, succinic acid, sebacic acid, and dodecanoic diacid.

Polyols include di-, tri- or tetraols or polyols having more than four hydroxyl groups. Polyols include ethylene glycol, propylene glycol, 1,3-butylene glycol, 2-methylpropanediol, 1,4-butylene glycol, neopentyl glycol, 1,6-hexane glycol, 1,2-dodecane glycol, glycerin, trimethylol propane, trimethylol methane, pentaerythritol, dipentaerythritol, hydroxy pivalic acid neopentyl glycol ester, 1,4-cyclohexane dimethanol, ethylene oxide additive of bisphenol A, propylene oxide additive of bisphenol A, and 1,4-hydroquinone.

Lactones include those having 4–10 carbon atoms. The preferred lactone is ε-caprolactone.

Polyester oligomers having an alicyclic epoxy group and a hydroxyl group in a molecule can be prepared, for example, by reacting monomers having an alicyclic epoxy group and a hydroxyl group with polybasic acids or their anhydrides in such a manner that the amount of the latter compounds is excessive in respect of the amount of the hydroxyl group, and then reacting the resultant carboxylic acid-containing oligoesters with epoxy compounds having 13–15 carbon atoms. In this case, the epoxy group preferentially reacts with a carboxylic group even if there is any hydroxyl group, to form an ester group and produce a secondary hydroxyl group. If necessary, lactones can be reacted with the hydroxyl group of the resultant hydroxyl group-containing oligoesters, to extend the polymer chains, for the purposes of improving the flexibility of the cross-linked portions of the coating. Further, the monomers having an alicyclic epoxy group and a hydroxyl group can be reacted with the above-mentioned polybasic acids or their anhydrides and then reacted with polyols to form polyesters.

The proportions of the amount of the monomers having an alicyclic epoxy group and a hydroxyl group per polybasic acids or their anhydrides are such that an excessive amount of carboxylic groups is used per one mole of the monomer. In addition, the amounts of the carboxylic acid-containing oligomers and epoxy compounds are such that a carboxylic group reacts with an epoxy group in an equivalent amount. Further, the amount of caprolactone to be used in respect of the resultant oligomers having an alicyclic epoxy group is such that it is equivalent to or more than that of the hydroxyl group of the oligomers.

In the same manner as the above, monomers having an alicyclic epoxy group and one of a hydroxyl group and an isocyanate group can be reacted with monomers having the other of a hydroxyl group and an isocyanate group, to produce polyurethane oligomers. Further, mononers having an alicyclic epoxy group and a silanol group or a hydrolyzable silyl group can be polymerized, to produce silicone oligomers having an alicyclic epoxy group. Further, monomers having an alicyclic epoxy group and a carboxylic group or an anhydride group can be reacted with monomers having an amino group, to produce polyamide oligomers having an alicyclic epoxy group.

Among those oligomers having an alicyclic epoxy group, polyester oligomers are preferred since the desired amount of the desired functional group can be introduced into the oligomers. Accordingly, polyester oligomers are preferably used for the present invention, as well as acrylic oligomers.

The silanol group usable can be represented by the following formula:

(49)

In the formula, $R^1$ and $R^2$ may be the same as or different from each other and are a hydroxyl group, an alkyl group, an alkoxy group, —$NR^1R^2$ group ($R^1$ and $R^2$ are an alkyl group or an aryl group), —$NR^1COR^2$ ($R^1$ and $R^2$ are an alkyl group or an aryl group), —$COR^1$ group ($R^1$ is an alkyl group or an aryl group), —$OCOR^1$ group ($R^1$ is an alkyl group or an aryl group), an aryl group, —$ONR^1R^2$ group ($R^1$ and $R^2$ are an alkyl group or an aryl group), or —$ONCR^1R^2$ group ($R^1$ and $R^2$ are an alkyl group or an aryl group).

The alkyl group includes a linear or branched alkyl group having 1–10 carbon atoms, such as a methyl group, an ethyl group, a propyl group, an isopropyl group, a butyl group, an isobutyl group, an s-butyl group, a t-butyl group and a pentyl group. The alkoxy group includes those alkoxy groups whose alkyl moiety is the same as the above alkyl group. The aryl group includes a phenyl group which may be substituted with a substituent. The substituent includes a halogen atom, an alkyl group, an alkoxy group and the like. The halogen atom as a substituent includes a fluorine atom, a chlorine atom, bromine atom, and an iodine atom. The alkyl group as a substituent includes a linear and branched alkyl groups having 1–10 carbon atoms, such as a methyl group, ethyl group, propyl group, isopropyl group, butyl group, isobutyl group, s-butyl group, t-butyl group, and pentyl group. The alkoxy group as a substituent includes those alkoxy groups whose alkyl moiety corresponds to the alkyl group as stated above. The preferred substituent includes a halogen atom such as a fluorine atom and a lower alkyl group having 1–5 carbon atoms.

The hydrolyzable silyl group is a silanol group blocked with a hydrolyzable group and is generally represented by the following formula:

(50)

In the formula (50) above, $R^1$ and $R^2$ are the same as those of the formula (49); and $R^3$ is an alkyl group, —$NR^1R^2$ group ($R^1$ and $R^2$ are an alkyl group or an aryl group), —$COR^1$ group ($R^1$ is an alkyl group or an aryl group), an aryl group, —$NR^1R^2$ group ($R^1$ and $R^2$ is an alkyl group or an aryl group), and —$NCR^1R^2$ group ($R^1$ and $R^2$ are an alkyl group or an aryl group).

The oligomers having such a silanol group or a hydrolyzable silyl group can be prepared by (co)polymerizing monomers having such functional groups. As such monomers, various monomers can be suitably selected to be used. For example, the representative monomers having a silanol group or a hydrolyzable silyl group are as follows:

[1] Vinyl Monomers

As vinyl monomers, preferred are monomers having a silanol group or a hydrolyzable silyl group and a radically polymerizable unsaturated bond. The radically polymerizable unsaturated bond includes the following bonds:

(51)

(52)

(53)

(54)

(55)

In the formulae (51) to (55) above, $R^1$ is a hydrogen atom or an alkyl group having 1–6 carbon atoms, and Y is a phenylene group.

The monomers having the radically polymerizable unsaturated bond represented by the formula (51) are preferably the following ones.

(56)

In the formula (56), $R^1$ is defined above, $R^2$ is a bivalent aliphatic hydrocarbon group, X is a silanol group or a hydrolyzable silyl group represented by the formulae (49) or (50).

The bivalent aliphatic hydrocarbon group as $R^2$ includes an alkylene group, a cycloalkylene group and an arylene group.

The alkylene group includes a linear or branched alkylene group, such as a methylene group, an ethylene group, a propylene group, a butylene group, an isobutylene group and a hexamethylene group. The cycloalkylene group includes a cyclopentylene group and a cyclohexylene group. The arylene group includes o-, m- or p-phenylene group, a naphthalene group, a fluorene group, an indolene group, an anthracene group, a furan group, and a thiophene group.

The examples of the monomers represented by the formula (56) include γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryloyloxypropylmethyldiethoxysilane, γ-(meth)acryloyloxypropylmethyldipropoxysilane, γ-(meth)acryloyloxybutylphenyldimethoxysilane, γ-(meth)acryloyloxyphenyldiethoxysilane, γ-(meth)acryloyloxyphenyldipropoxysilane, γ-(meth)acryloyloxypropyldimethylmethoxysilane, γ-(meth)acryloyloxypropyldimethylethoxysilane, γ-(meth)acryloyloxypropylphenylmethylmethoxysilane, γ-(meth)acryloyloxypropylphenylmethylethoxysilane, γ-(meth)acryloyloxypropyltrisilanol, γ-(meth)acryloyloxypropylmethyldihydroxysilane, γ-(meth)acryloyloxybutylphenyldihydeoxysilane, γ-(meth)acryloyloxypropyldimethylhydroxysilane and γ-(meth)acryloyloxy propylphenylmethylhydroxysilane.

The examples of the monomers represented by the formula (52) include the following monomers.

$$CH_2=\overset{R^1}{\underset{|}{C}}-Y-R^2-X \quad (57)$$

$$CH_2=\overset{R^1}{\underset{|}{C}}-Y-X \quad (58)$$

$$CH_2=\overset{R^1}{\underset{|}{C}}-Y-O-R^2-X \quad (59)$$

In the formulae, $R^1$, $R^2$, Y and X are defined above.

The examples of the monomers represented by the formulae (57) to (59) include the following monomers.

$$CH_2=C(CH_3)-C_6H_4-C_2H_4-Si(OCH_3)_3 \quad (60)$$

$$CH_2=C(CH_3)-C_6H_4-C_2H_4-Si(CH_3)_2OCH_3 \quad (61)$$

$$CH_2=CH-C_6H_4-C_2H_4-Si(OH)_3 \quad (62)$$

$$CH_2=C(CH_3)-C_6H_4-C_2H_4-Si(CH_3)_2OH \quad (63)$$

$$CH_2=CH-C_6H_4-C_3H_6-Si(OCCH_3)_3 \text{ (with C=O)} \quad (64)$$

$$CH_2=C(CH_3)-C_6H_4-Si(OCH_3)_3 \quad (65)$$

$$CH_2=CH-C_6H_4-Si(CH_3)_2N(CH_3)_2 \quad (66)$$

$$CH_2=C(CH_3)-C_6H_4-O-C_2H_4-Si(OC_2H_5)_2(C_6H_5) \quad (67)$$

The monomers represented by the formula (53) include the following monomers.

$$CH_2=\overset{R^1}{\underset{|}{C}}-X \quad (68)$$

$$CH_2=\overset{R^1}{\underset{|}{C}}-R^2-X \quad (69)$$

In the formulae above, $R^1$, $R^2$ and X are defined above. The examples of the monomers represented by the formulae (68) and (69) include the following monomers.

$CH_2=CH-Si(OCH_3)_3$
$CH_2=CH-Si(OC_2H_5)_3$
$CH_2=CH-Si(OCH_3)_2CH_3$
$CH_2=CH-Si(CH_3)_2OCH_3$
$CH_2=CH-CH_2-Si(OCH_3)_3$
$CH_2=CH-Si(OCOCH_3)_3$
$CH_2=CH-CH_2-Si(OCOCH_3)_3$
$CH_2=CH-Si(CH_3)_2-N(CH_3)_2$
$CH_2=CH-Si(CH_3)(C_6H_5)-N(CH_3)COCH_3$
$CH_2=CH-Si(C_6H_5)_2-ON(CH_3)_2$

The monomers represented by the formula (54) include the following monomers.

$$CH_2=CHO-R^2-X \quad (70)$$

$$CH_2=CHO-X \quad (71)$$

In the formulae above, $R^2$ and X are defined above. The examples of the monomers represented by the above formulae include the following monomers.

$CH_2=CHO-(CH_2)_3-Si(CH_3)_2-NHCOCH_3$
$CH_2=CHO-(CH_2)_2-Si(CH_3)_2OCH_3$
$CH_2=CHO-Si(CH_3)_2-OCN(CH_3)_2$
$CH_2=CHO-Si(CH_3)_2-ON(C_2H_5)_2$

The monomers represented by the formula (55) include the following monomers.

$$CH_2=CHCH_2O-X \quad (72)$$

$$CH_2=CHCH_2O-R^2-X \quad (73)$$

In the formulae above, $R^2$ and X are defined above. The examples of the monomers represented by the above formulae are as follows.

$CH_2=CHCH_2O-Si(C_2H_5)(C_6H_5)N(CH_3)_2$
$CH_2=CHCH_2O-Si(C_6H_5)_2NHCOC_2H_5$
$CH_2=CHCH_2O-(CH_2)_2-Si(OCH_3)(OCOCH_3)-OCOC_2H_5$
$CH_2=CHCH_2O-(CH_2)_2-Si(CH_3)(OC_2H_5)$

[2] Silane monomers

As silane monomers, preferred are the following monomers.

$$R^1-\underset{\underset{R^4}{|}}{\overset{\overset{R^2}{|}}{Si}}-R^3 \quad (74)$$

In the formula above, $R^1$-$R^4$ are the same as those in the formula (49). The representative examples of the monomers include dimethyldimethoxysilane, dibutyldimethoxysilane, diisopropyldipropoxysilane, diphenyldibutoxysilane, diphenyldiethoxysilane, diethyldisilanol, dihexyldisilanol, methyltrimethoxysilane, methyltriethoxysilane, propyltrimethoxysilane, phenyltriethoxysilane, phenyltributyroxysilane, hexyltriacetoxysilane, methyltrisilanol, tetramethoxysilane, tetraethoxysilane, tetrapropoxysilane, tetraacetoxysilane, diisopropoxysilane, tetrasilanol, $$CH_3O-\underset{\underset{OCH_3}{|}}{\overset{\overset{OCH_3}{|}}{Si}}-OCH_3, \quad CH_3COO-\underset{\underset{OCOCH_3}{|}}{\overset{\overset{CH_3}{|}}{Si}}-OCOCH_3,$$

$$C_2H_5O-\underset{\underset{OC_2H_5}{|}}{\overset{\overset{Ph}{|}}{Si}}-OC_2H_5 \quad \text{(Ph is a phenyl group),}$$

-continued

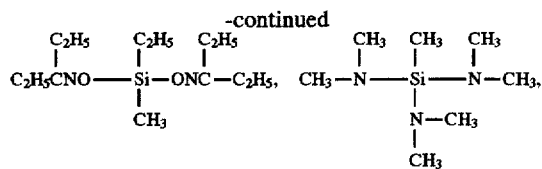

and the like.

The oligomers having a silanol group or a hydrolyzable silyl group can be prepared by polymerizing the above monomers. The polymerization process is the same as that for the polymerization of the oligomers having an alicyclic epoxy group. The oligomers having, in a molecule, an alicyclic epoxy group and a silanol group or a hydrolyzable silyl group can be prepared by polymerizing the monomers having a silanol group or a hydrolyzable silyl group with the monomers having an alicyclic epoxy group. Further, the oligomers having a silanol group or a hydrolyzable silyl group can be prepared by polymerizing monomers having a silanol group or a hydrolyzable silyl group with an α, β-ethylenically unsaturated monomer as stated in the production of the oligomers having an alicyclic epoxy group.

Suitable monomers to be used for the synthesis of the oligomers having a silanol group or a hydrolyzable silyl group are those having the radically polymerizable unsaturated bond represented by the formulae (51) and (52), or silane monomers represented by the formula (74), because the resultant coating has good coating appearance and because they are easy to be prepared. Further, polysiloxane macromers produced by polymerizing acrylic monomers having the formula (51) with silane monomers represented by the formula (74) are also preferred monomers. The examples of the macromers are as follows:

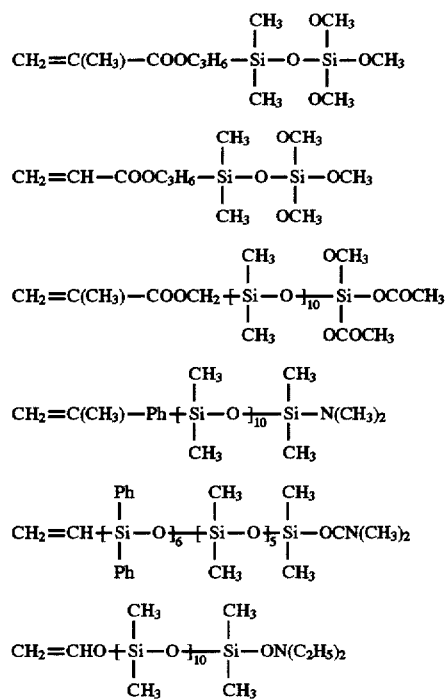

-continued

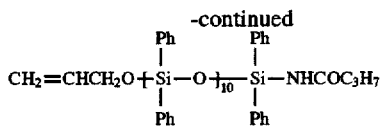

In the formulae above, Ph is a phenyl group.

The blocked hydroxyl group can be represented by the following formula.

In the formula above, Z means a block group attached to the hydroxyl group and derived from the blocking agent. The group Z is preferably the following block groups.
[1] Silyl block group
The silyl block group includes the following group.

In the formula (76) above, $R^1$-$R^3$ are an alkyl or aryl group.

The alkyl group includes a linear or branched alkyl group having 1–10 carbon atoms. The preferred alkyl groups include lower alkyl groups having 1–8 carbon atoms, such as a methyl group, an ethyl group, a propyl group, a butyl group, an s-butyl group, a t-butyl group, a pentyl group and a hexyl group. The aryl group includes a phenyl group, a naphthyl group and indenyl group, which may be substituted with a substituent. The preferred aryl group is a phenyl group.

The blocking agent for forming such silyl block group preferably includes halogenated silanes. The halogen atom used for the halogenation includes a chlorine atom and a bromine atom. The examples of the blocking agents include trimethylsilyl chloride, diethylmethylsilyl chloride, ethyldimethylsilyl chloride, butyldimethylsilyl bromide and butylmethylethylsilyl bromide.
[2] Vinyl ether block group As vinyl ether block groups, preferred are the following groups.

In the formula above, $R^1$, $R^2$ and $R^3$ are respectively a hydrogen atom or a hydrocarbon group having 1–18 carbon atoms. $R_4$ is a hydrocarbon group having 1–18 carbon atoms. $R^3$ and $R_4$ may be combined to form a heterocyclic ring containing Y as a heteroatom. Y is an oxygen atom or a sulfur atom.

The hydrocarbon group includes an alkyl group, a cycloalkyl group and an aryl group. The alkyl group preferably lower alkyl groups having 1–8 carbon atoms, such as a methyl group, an ethyl group, a propyl group, a butyl group, an s-butyl group, a t-butyl group, a pentyl group and a hexyl group. The cycloalkyl group preferably includes a cyclopentyl group and a cyclohexyl group. The aryl group preferably includes a phenyl group, a naphthyl group and an anthracene group, which may have a substituent.

The vinyl ether block group can be prepared by reacting a hydroxyl group with an aliphatic vinyl ether or thioether or a cyclic vinyl ether. The aliphatic vinyl ether includes methylvinyl ether, ethylvinyl ether, isopropyl vinyl ether, n-propyl vinyl ether, isopropyl vinyl ether, 2-ethylhexyl vinyl ether and cyclohexyl vinyl ether, or vinyl thioether corresponding to these vinyl ethers. The cyclic vinyl ether includes 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran, 3,4-dihydro-2-ethoxy-2H-pyran, and 3,4-dihydro-2H-pyran-2-carboxylic acid.

In the present invention, the hydroxyl group-containing monomers usable for the production of the oligomers having a hydroxyl group or a blocked hydroxyl group are preferably those monomers having a hydroxyl group or a blocked hydroxyl group and a radically polymerizable unsaturated bond.

The monomers having a hydroxyl group and a radically polymerizable unsaturated bond preferably the following hydroxyl group-containing monomers.

(78)

In the formula above, $R^1$ is a hydrogen atom or a methyl group; $R^2$ is an alkylene group, a cycloalkylene group or an arylene group; Y is —COO—, a sigle bond or —O—. Especially, it is preferable that acrylic monomers having the formula above wherein X is —COO— should be used.

The alkylene group includes a linear or branched alkylene group having 1–18 carbon atoms. The preferred alkylene group is lower alkylene group having 1–6 carbon atoms, such as a methylene group, an ethylene group, a propylene group, a butylene group, an isobutylene group, and a hexamethylene group. The cycloalkylene group is preferably those having 5–8 carbon atoms, such as a cyclopentylene group and a cyclohexylene group. The arylene group includes o-, m- or p-phenylene group, a naphthalene group, a fluorene group, an indolene group, an anthracene group, a furan group, and a thiophene group.

The preferred hydroxyl group-containing monomers are hydroxyl group-containing acrylic monomers, such as 2-hydroxyethyl(meth)acrylate and 3-hydroxypropyl(meth)acrylate.

Monomers having a blocked hydroxyl group are preferably those monomers produced by blocking the hydroxyl group of the above hydroxyl group-containing monomers.

The blocked hydroxyl group-containing monomers having a hydroxyl group blocked with a silyl block group include trimethylsiloxyethyl(meth)acrylate, trimethylsiloxypropyl(meth)acrylate, trimethylsiloxybutyl (meth)acrylate, triethylsiloxyethyl(meth)acrylate, tributysiloxypropyl(meth)acrylate and triphenylsiloxyethyl (meth)acrylate.

The monomers having such silyl block group also include (meth)acrylamides having N-methylol group, β-hydroxyethyl(meth)acrylate which is modified with ε-caprolactone by the addition reaction thereof, and (meth) acrylate of polyoxyalkylene glycol whose hydroxyl group is blocked with a silyl block group.

The blocked hydroxyl group-containing monomers having a hydroxyl group blocked with an aliphatic vinyl ether group include 1-alkylalkoxy-alkyl(meth)acrylates, such as 1-methylethoxyethyl(meth)acrylate, 1-ethylethoxyethyl (meth)acrylate, 1-butylethoxyethyl(meth)acrylate, 1-(2-ethylhexyl)ethoxyethyl(meth)acrylate, 1-isobutylethoxyethyl(meth)acrylate and cyclohexylethoxyethyl(meth)acrylate.

The blocked hydroxyl group-containing monomers having a hydroxyl group blocked with a cyclic vinyl ether include the following monomer.

(79)

In the formula above, Z is a tetrahydrofuran group, a tetrahydropyran group or a group represented by the following formula.

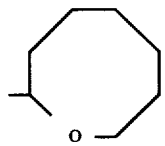

The oligomers having a hydroxyl group or a blocked hydroxyl group can be prepared by the polymerization of the above monomers. The polymerization process can be carried out in the same manner as the polymerization of the oligomers having an alicyclic epoxy group. Further, the oligomers having, in a molecule, an alicyclic epoxy group or a silanol group or a hydrolyzable silyl group and a hydroxyl group or a blocked hydroxyl group can be prepared by polymerizing the monomers having a hydroxyl group or a blocked hydroxyl group with the monomers having an alicyclic epoxy group or with the monomers having a silanol group or a hydrolyzable silyl group. Further, the oligomers having a hydroxyl group or a blocked hydroxyl group can be prepared by reacting the monomers having a hydroxyl group or a blocked hydroxyl group with an α, β-ethylenically unsaturated monomer as stated in relation to the production of the oligomers having an alicyclic epoxy group.

In the present invention, the polyester oligomers having a hydrocyl group in a molecule are preferably those polyester oligomers of star type. Such polyester oligomers can be synthesized as follows:
(1) A compound having 3 or more hydroxyl groups in a molecule is reacted with a compound having an anhydride group in a molecule, and then reacted with lactone and finally reacted with a monoepoxy compound.
(2) A compound having 3 or more hydroxyl groups in a molecule is reacted with a compound having an anhydride group in a molecule, and then reacted with a monoepoxy compound, and finally reacted with lactone.
(3) A compound having 3 or more hydroxyl groups in a molecule is reacted with lactone, and then reacted with a compound having an anhydride group in a molecule, and finally reacted with a monoepoxy compound. In this case, the monoepoxy compound may also contain a hydroxyl group.
(4) A compound having 3 or more epoxy groups in a molecule is reacted with a hydroxy acid, and then reacted with a lactone.

The compound having 3 or more hydroxyl groups in a molecule includes trimethylol propane, trimethylol ethane, pentaerythritol and dipentaerythritol.

The anhydride includes aromatic polybasic acid anhydrides, such as phthalic anhydride, tetrahydrophthalic anhydride, hexahydrophthalic anhydride, methyltetrahydrophthalic anhydride and trimellitic anhydride; and aliphatic polybasic acid anhydrides, such as maleic anhydride and succinic anhydride.

The lactone includes those lactones having 4–10 carbon atoms. The preferred lactone is ε-caprolactone.

The monoepoxy compound includes aliphatic monoepoxy compounds such as propylene oxides, e.g., AoEX24, AoEX68 (manufactured by Daisel Ltd.), glycidyl ethers, such as Cajular EID or PES10 (manufactured by Uka Shell), and glycidyl ethers, such as butyl glycidyl ether, decyl glycidyl ether, phenyl glycidyl ether and cresyl glycidyl ether.

The hydroxyl acid includes pivalic acid, 12-hydroxy stearic acid and the reaction products produced by reacting polyols, for example, diols such as ethylene glycol, propylene glycol, 1,5-hexane diol, 1,6-hexane diol, neopenty glycol and cyclohexane dimethanol or tri-ols such as trimethylol propane, trimethylol ethane and glycerin or tetra-ols such as pentaerithritol and diglycerin, with a compound having an anhydride in a molecule.

The compound having 3 or more epoxy groups in a molecule includes tris glycidyl isocyanurate, tris glycidyl propyl isocyanurate, tris glycidylethyl isocyanurate, tetra glycidyl methaxylene diamine, tetra glycidyl-1,3-bis-aminomethylcyclohexane, tetra glycidyl diaminodiphenylmethane, triglycidy p-aminophenol and diglycidyl aniline.

In the above reaction, when the oligomers having a hydroxyl group and a carboxylic group are reacted with the epoxy compounds, the epoxy compounds preferentially react with the carboxylic group rather than the hydroxyl group, to form an ester bond and also to produce a secondary hydroxyl group. When the oligomers having a hydroxyl group and a carboxylic group are reacted with the lactones, the lactones preferentially react with the hydroxyl group rather than the carboxylic group.

In case where the present resin composition contains a hydroxyl group, a curing agent may be incorporated into the coating composition.

Such curing agents preferably include amino resins or isocyanate prepolymers or the mixture thereof.

The amino resins preferably include completely alkoxylated melamine resin, iminated melamine resin, or methylolated melamine resin.

Especially, it is preferable that the melamine resin comprises 70% or higher of the melamine resins consisting of one triazole ring.

The isocyanate prepolymers preferably are isocyanurate compounds of hexamethylene diisocyanate.

The amino resin is used in an amount of generally 0.1–0.4 moles, preferably 0.1–0.3 moles per mole of the hydroxyl group of the hydroxyl group-containing oligomers. The isocyanate prepolymer is used in an amount such that the isocyanate amount to the hydroxyl group amount is 1:0.6–1.4, preferably 1:0.7–1.3.

The cationic polymerization catalyst used in the present invention acts as cleaving the alicyclic epoxy group and promoting the reaction. The preferred catalysts are as follows. In this case, there are two types of the catalysts, namely, the silicon-containing catalyst and no silicon-containing catalyst.

(1) Cationic polymerization catalyst containing silicon

As such cationic polymerization catalyst, organometallic chelates are preferably used. The representative organometallic chelates include organoaluminum chelates, organozirconium chelates and organotitanium chelates. In particular, compounds containing, as a ligand forming a stable chelate ring, compounds which can form keto-enol tautomers can be listed as the preferred organometallic chelates. Incidentally, the organometallic chelates can act as a dissociation catalyst in case where a hydrolyzable silyl group is used.

The compounds which can form keto-enol tautomers include β-diketones such as acetylacetone; estes of acetoacetic acid, such as ethyl acetoacetate; esters of malonic acid, such as ethyl malonate and propyl malonate; ketones having a hydroxyl group at β-position such as diacetone alcohols; and aldehydes having a hydroxyl group at β-position such as methyl salicylate. In particular, the preferred compounds include β-diketones and esters of acetoacetic acid.

The organometallic chelates may be generally produced by reacting the above keto-enol tautomers with metal alcoholates such as aluminum alcoholates, titanium alcoholates, or zirconium alcoholates.

The organoaluminum chelates may be generally and easily prepared by mixing one mole of aluminum alcoholates having the following formula with 3 moles or less of the compounds which can form keto-enol tautomers and, if necessary, heated.

In the formula above, $R^1$, $R^2$ and $R^3$ are the same as or different from each other and a linear or branched alkyl alkenyl group having 1–18 carbon atoms. The alkyl group includes a methyl group, an ethyl group, a propyl group, a butyl group, an s-butyl group, a t-butyl group, a pentyl group, a hexyl group, heptyl group, an octyl group, a nonyl group, a decyl group, an undecy group, a dodecyl group, a tridecyl group and an octadecyl group. The alkenyl group includes a vinyl group and an allyl group.

The aluminum alcoholates represented by the above formula include aluminum trimethoxide, aluminum triethoxide, aluminum tri-2-propoxide, aluminum triisopropoxide, and aluminum tributoxide.

The organotitanium chelates may be generally and easily prepared by mixing one mole of titanium of titanates having the following formula with 4 moles or less of the compounds which can form keto-enol tautomers and, if necessary, heated.

In the formula above, $R^1$, $R^2$, $R^3$, $R^4$ and $R^5$ are the same as $R^1$, $R^2$ and $R^3$ in the formula (80) and n is an integer of 0–20.

The compounds having the formula (81) wherein n is 0 include tetramethyl titanate, tetraethyl titanate, tetra-n-propyl titanate, tetraisopropyl titanate, tetraisobutyl titanate, tetra-n-butyl titanate, tetrabutyl titanate, tetra-n-pentyl titanate and tetra-n-lauryl titanate.

The preferred compounds include tetraisopropyl titanate, tetraisobutyl titanate and tetra-n-butyl titanate. The compounds having the formula (81) wherein n is 1 or higher includes dimers to 11-mers of tetraisopropyl titanate, tetraisobutyl titanate and tetra-n-butyl titanate.

The organozirconium chelates may be generally and easily prepared by mixing one mole of zirconium of zirconates having the following formula (82) with 4 moles or less of the compounds which can form keto-enol tautomers and, if necessary, heated.

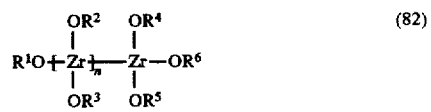

In the formula above, $R^1$, $R^2$, $R^3$, $R^4$ and $R^5$ as well as n are the same as those used in the formula (81).

The compounds having the formula (82) wherein n is 0 include tetramethyl zirconate, tetraethyl zirconate, tetra-n- propyl zirconate, tetraisopropyl zirconate, tetraisobutyl zirconate, tetra-n-butyl zirconate, tetrabutyl zirconate, tetra-n-pentyl zirconate and tetra-n-lauryl zirconate. The preferred compounds include tetraisopropyl zirconate, tetraisobutyl zirconate and tetra-n-butyl zirconate. The compounds having the formula (82) wherein n is 1 or higher includes dimers to 11-mers of tetraisopropyl zirconate, tetraisobutyl zirconate and tetra-n-butyl zirconate.

The preferred silicon-containing cationic polymerization catalysts are organoaluminum chelates, in view of the curability of the coating composition.

The metal alcoholates to be used for forming the above organometallic chelates are also preferred cationic polymerization catalysts. Among them, preferred are aluminum alcoholates.

(2) Cationic polymerization catalyst containing no silicon
(i) Protonic acids or protonic acids neutralized with Lewis bases The protonic acids include hydrohalogenic acids such as hydrofluoric acid, hydrogen chloride and hydrogen bromide, sulfuric acid and monoester of sulfuric acid, phosphoric acid and mono- or di-esters of thereof, esters of polyphosphoric acid, boric acid and mono- or di-esters thereof, sulfonic acids such as p-touenesulfonic acid, methane sulfonic acid, dodecylbenzene sulfonic acid and trifluoromethane sulfonic acid, and trifluoroacetic acid.

The alcohols constituting of the esters of protonic acids include primary alcohols such as n-propyl alcohol, n-butanol, n-hexanol and n-octanol, and secondary alcohols such as isopropanol, s-butanol and s-hexanol.

The Lewis bases include ammonium, amines such as monoethyl amine, triethyl amine, pyridine, piperidine, aniline, morpholine, cyclohexyl amine, n-butyl amine, monoethanol amine, diethanol amine and triethanol amine, phosphines such as trialkylphosphines and triaryl phosphines, and triarylphosphites.

(ii) Lewis acids or those neutralized with Lewis bases

The Lewis acids include boron trifluoride, diethylether complexes of boron trifluoride, aluminum trichloride, iron trichloride, tin tetrachloride, zinc dichloride and titanium tetrachloride. The Lewis bases used for neutralizing Lewis acids include those as mentioned above.

(iii) Esters of sulfonic aids

The esters of sulfonic acids are preferably presented by the following formula:

(83)

In the formula above, $R^1$ is a phenyl group, a naphthyl group and an alkyl group. $R^2$ is an aklyl group, alkenyl group, aryl group, alkaryl group and cycloalkyl group which is bonded to a sulfonyloxy group through a primary or secondary carbon atom.

The phenyl group or naphthyl group as $R^1$ includes substituted or unsubstituted phenyl group or naphthyl group. The substituent includes a halogen atom, an alkyl group having 1–8 carbon atoms, a cycloalkyl group having 5–7 carbon atoms or an alkoxy group having 1–8 carbon atoms.

The alkyl group as $R^1$ includes a linear or branched alkyl group having 1–18 carbon atoms, such as a methyl group, an ethyl group, a propyl group, an isopropyl group, a butyl group, an isobutyl group, an s-butyl group, a t-butyl group, an n-pentyl group, a hexyl group and an octyl group.

The alkyl group as $R^2$ is the same as $R^1$ as mentioned above.

The alkenyl group as $R^2$ is a linear or branched alkenyl group having 3–18 carbon atoms, such as a propenyl group, a butenyl group, and a pentenyl group.

The aryl group as $R^2$ includes a phenyl group or a naphthyl group as mentioned above.

The alkaryl group as $R^2$ includes those constituted of the alkyl groups as stated above and the aryl groups as stated above.

The alkanol group as $R^2$ includes those alkanol groups having 1–18 carbon atoms, such as an ethanol group, a propanol group, an n-butanol group, an s-butanol group, a t-butanol group, an n-pentanol group, and an s-pentanol group.

The cycloalkyl group as $R^2$ includes a linear or branched cycloalkyl group having 5–10 carbon atoms, such as a cyclopentyl group, 2-methylcyclopentyl group and a cyclohexyl group.

The examples of such compounds include esters of sulfonic acids such as methane sulfonic acid, ethane sulfonic acid, benzene sulfonic acid, dodecylbenzene sulfonic acid, naphthalene sulfonic acid and nonylbenzene sulfonic acid, with primary alcohols such as n-propanol, n-butanol, n-hexanol and n-octanol or secondary alcohols such as isopropanol, s-butanol and s-hexanol.

(iv) Esters of phosphoric acids

Preferred is the phosphate esters having the following formula.

(84)

In the formula above, $R^1$ is an alkyl group having 3–10 carbon atoms, a cycloalkyl group having 5–10 carbon atoms, an aryl group having 6–20 carbon atoms, and m is 1 or 2.

The alkyl group as $R^1$ includes a linear or branched alkyl group, such as a propyl group, an isopropyl group, an n-butyl group, an s-butyl group, a t-butyl group, an n-pentyl group, a hexyl group, a heptyl group, and an octyl group.

The cycloalkyl group as $R^1$ includes linear or branched cycloalkyl group, such as a cyclopentyl group, 2-methyl cyclopentyl group, and cyclohexyl group.

The aryl group as $R^1$ includes a phenyl group or a naphthyl group which may have a substituent. The range of the substituent is the same as that of $R^1$ in the formula (82).

The examples of the compounds include monoesters or diesters of phosphoric acid with primary alcohols such as n-propanol, n-butanol, n-hexanol and n-octanol or secondary alcohols such as isopropanol, s-butanol, s-hexanol and cyclohexanol.

(v) Onium salts

The onium salts include those represented by the following formulae (85) to (88):

 (85)

 (86)

 (87)

 (88)

In the formular above, $R^1$ is an alkyl group, an alkenyl group, an aryl group, an alkaryl group, an alkanol group or a cycloalkyl group.

Two $R^1$ may be combined with each other to form a heterocyclic ring together with a hetero atom such as N, P, O or S.

The alkyl group as $R^1$ includes a linear or branched alkyl group having 1–12 carbon atoms, such as a methyl group, an ethyl group, a propyl group, an isopropyl group, an n-butyl group, an s-butyl group, a t-butyl group, an n-pentyl group, a hexyl group, a heptyl group and an octyl group.

The alkenyl group as $R^2$ includes a linear or branched alkenyl group having 3–12 carbon atoms, such as a propenyl group, a butenyl group and a pentenyl group.

The aryl group as $R^2$ includes a substituted or unsubstituted phenyl group or a naphthyl group. The substituent includes a halogen atom, an alkyl group having 1–8 carbon atoms, a cycloalkyl group having 5–7 carbon atoms and an alkoxy group having 1–8 carbon atoms.

The alkaryl group as $R^2$ includes those constituted of the alkyl groups as stated above and the aryl groups as stated above.

The alkanol group as $R^2$ includes alkanol groups having 1–12 carbon atoms, such as an ethanol group, a propanol group, an n-butanol group, an s-butanol group, a t-butanol group, an n-pentanol group, and an s-pentanol group.

The cycloalkyl group as $R^2$ includes a linear or branched cycloalkyl group having 5–10 carbon atoms, such as a cyclopentyl group, 2-methylcyclopentyl group and a cyclohexyl group.

$X^-$ includes $SbF_6^-$, $AsF_6^-$, $PF_6^-$ or $BF_4^-$.

Among those cationic polymerization catalysts, protonic acids neutralized with Lewis bases, Lewis acids neutralized with Lewis bases, and the compounds represented by the formulae (85) to (88) are called heat-potential cationic polymerization catalysts and form cationic polymerization catalysts by heating them, for example, at 50° to 200° C. so as to catalize the curing of the resin. Such heat-potential cationic polymerization catalysts cannot catalyze the curing reaction when they are not heated. The viscosity of the coating composition does not increase and the composition does not gel, even though it is stored as it is for a long period of time. Therefore, it is very easy to handle.

The preferred heat-potential cationic polymerization catalyst includes quaternary ammonium salts, sulfonium salts, phosphonium salts and iodonium salts. p The quaternary ammonium salts include N,N-dimethyl-N-benzylanilinium hexafluoroantimonate, N,N-dimethyl-N-benzylanilinium tetrafluoroborate, N,N-dimethyl-N-benzylpyridinium hexafluoroantimonate, N,N-diethyl-N-benzyl trifluoromethanesulfonic acid, N,N-dimethyl-N-(4-methoxybenzyl)pyridinium hexafluoroantimonate, N,N-diethyl-N-(4-methoxybenzyl)pyridinium hexafluoroantimonate, and N,N-diethyl-N-(4-methoxybenzyl)toludinium hexafluoroantimonate.

The sulfonium salts include triphenylsulfonium tetrafluoroborate, triphenylsulfonium hexafluoroantimonate, triphenylsulfonium hexafluoroarsenate, Adeca CP-66 (manufactured by Asahi Denka Kogyo), Adaca CP-77 (manufactured by Asahi Denka Kogyo), tri(4-methoxyphenyl) sulfonium hexafluoroarsenate, and diphenyl(4-phenylthiophenyl)sulfonium hexafluoroarsenate.

The phosphonium salts include ethyltriphenylphosphonium hexafluoroantimonate, and tetrabutyl phosphonium hexafluoroantimonate.

The iodonium salts include diphenyliodon hexafluoroarsemate, di-4-chlorophenyliodonium hexafluoroarsenate, di-4-bromophenylium hexafluoroarsenate, di-p-triiodonium hexafluoroarsenate, and phenyl-(4-methoxylphenyl)iodonium hexafluoroarsenate.

The cationic polymerization catalyst is used in a catalytic amount in respect of the present low solvent content-type resin composition. Specifically, the catalyst is used in an amount of 0.01 to 30 weight parts, preferably 0.1 to 10 weight parts, based on 100 weight parts of the total solid content of the present low solvent content-type resin composition. When the amount of the catalyst is too small, the coating appearance and curability are deteriorated. On the other hand, when the amount of the catalyst is too much, the coating composition cures before the composition is applied to the material to be coated, the coating is colored and the coating properties are deteriorated.

In this connection, the heat-potential cationic polymerization catalysts can be heated generally at 50°–200° C., preferably 60° to 170° C. for 2 min. to one hour, to promote the curing of the present resin composition. In case where the coating composition is used in two-liquid type, two liquids are combined before the coating and, therefore, substantially no consideration is necessary to be made on the curing of the resin. Accordingly, it is not so necessary to use such heat-potential cationic polymerization catalysts.

In order to effectuate the effects of the present composition, compounds having a functional group selected from the group consisting of a hydroxyl group, a blocked hydroxyl group, a hydrolyzable silyl group, an alicyclic epoxy group, and the like can be used in the coating composition as a reaction diluent, together with the present oligomers.

Such compounds include compounds having an alicyclic epoxy group, such as Celloxide 2021, 2081 and 2083 (manufactured by Daisel Ltd.), compounds having a hydrolyzable silyl group and an epoxy group, such as TSL8350 (manufactured by Toshiba Silicon Co., Ltd), and compounds having a hydroxyl group such as octyl alcohol and 1,5-pentanediol. The viscosity of these compounds is 500 cps or lower at 25° C., preferably 300 cps at 25° C. When the viscosity is larger than 500 cps, they cannot act as a reaction diluent.

The present resin composition can be used as it is, or in a combination thereof with various pigments (such as coloring pigments or brightening agents), anti-sagging agents or anti-settling agents, leveling agents, dispersants, anti-foaming agents, ultraviolet ray-absorbing agents, light stabilizers, anti-static agents, thinners and the like, which are conventionally used in the coating field.

The preferred examples of the pigments or brightening agents include titanium oxide, carbon black, precipitatable barium sulfate, calcium carbonate, talc, kaolin, silica, mica, aluminium, blood red, lead chromate, lead molybdate, chromium oxide, cobalt aluminate, azo pigments, phthalocyanine pigments, and anthraquinone pigments.

The preferred examples of the anti-sagging agents or anti-settling agents include bentonite, castor oil wax, amide wax, microgel and alumium acetate.

The preferred examples of the leveling agents include silicon-type agents such as KF69, KP321 and KP301 (manufactured by The Shin-Etsu Chemical Co., Ltd.), Modaflow (manufactured by Mitsubishi Monsant), BYK358 (manufactured by BYK-Chemie Japan KK), and Diaaid (manufactured by Mitsubishi Rayon Co., Ltd.).

The preferred examples of the dispersants include Anti-Terra U, Anti-Terra P and Disperbyk-101 (manufactured by BYK-Chemie Japan KK).

The preferred examples of the anti-foaming agents include BYK-0 (manufactured by BYK-Chemie Japan KK).

The preferred examples of the ultraviolet ray-absorbing agents include benzotriazol-type ultraviolet ray-absorbing agents such as Tinuvin 900, Tinuvin 384 and Tinuvin P (manufactured by Chiba Geigy) and oxalic anilide-type ultraviolet ray-absorbing agents such as Sanduvor-3206 (manufactured by Sandoz KK).

The preferred examples of the light stabilizers include hindered amine light stabilizers such as Sanol LS292 (manufactured by Sankyo Co., Ltd.) and Sanduvor 3058 (manufactured by Sandoz KK).

The thinners include aromatic compounds such as toluene, xylene and ethylbenzene; alcohols such as methanol, ethanol, propanol, butanol and isobutanol; ketons such as acetone, methylisobutyl ketone, methylamyl ketone, cyclohexanone, isophorone and N-methylpyrrolidone; esters such as ethyl acetate, butyl acetate and methyl cellosolve; and mixtures thereof.

The anti-static agents include Esocard C25 (manufactured by Lion Armor).

The present resin composition is useful for coating compositions, especially for clear coatings, intercoatings, solid color coatings and base coatings.

In particular, the present resin composition is excellent for clear coatings to be used for two coat-one bake system, three coat-one bake system or over coat system. The present coating composition can be coated on the substrate as an intercoating, base coating and a clear coating in this order. Alternatively, the present coating composition can be coated as a solid color coating or an intercoating. Further, the present coating composition can be used as an intercoating and a base coating of solvent-type or aqueous-type can be coated thereon in the state of wet-on-wet. Also, the present coating composition can be coated as a base coating and then the conventional clear coating can be coated thereon. Further, the conventional base coating can be coated and then the present coaing composition can be coated as a clear coating thereon in the state of wet-on-wet. In this case, the base coating is preferably a coating composition comprising an oligomer having a hydroxyl group and a weight average molecular weight of 6000 or lower and an imino-type and/or methylol-type melamine resin. Such base coating composition may be of an organic solvent-type and aqueous-type. The base coating composition preferably has a solid content of 35 wt. % or higher, much preferably 40 wt. % or higher.

The present composition has a low viscosity, even though the organic solvent content is small. Accordingly, the solid content of the coating composition can be made much higher than the conventional ones and can keep a suitable viscosity for coating compositions. For example, the content of the organic solvent can be reduced to 40% or less, preferably 35% or less, much preferably 30% or less. Although the lower limit is 0%, it is preferable that the solvent content is 5% in view of coating properties.

It is preferable that the present coating composition is coated while the substrate to be coated is rotated about a horizontal axis, in order to prevent the sagging even when the coating composition is coated with higher thickness, while the surface smoothness is improved. For example, even when the present coating composition is coated or baked and dried as the substrate to be coated, such as an automobile body, is vertically fixed and the substrate is horizontally rotated as disclosed in J.P. Kokai No. 63-178871, the composition can be coated with a thicker coating than the limit thickness which is a thickness such that the coating starts to form sagging at static condition.

More specifically, the present low solvent content type-coating composition is coated to the substrate which is supported rotatably about substantially horizontal axis so that the coating thickness is thicker than that which usually forms sagging on a vertically extending surface, and then dried to cure in such a manner that the substrate is started to rotate about the substantially horizontal axis before the sagging of the coating composition on the substrate is caused with gravity and so that the rotation is made at such a speed that the surface of the substrate is changed from the substantially vertical position to the substantially horizontal position before the sagging of the coating composition is caused with gravity and at such a speed that the sagging of the coating composition is not caused with centrifugal force caused by the rotation.

The rotation is preferably continuous rotation, because the sagging is effectively prevented. The rotation speed is usually 0.2 to 120 rpm, preferably 5 to 20 rpm. When the speed is 0.2 rpm or less, the sagging prevention effect is small. When the speed is 120 rpm or larger, the sagging is easy to be formed with centrifugal force. The rotation may be reversed in the manner of 90°→135°→160° in this order.

The coated composition on the substrate is set (usually without any heating device) or baked (with heating device) and transferred in a vertical direction, while the rotation is made about a horizontal axis, whereby forming coating.

The setting (drying) is made usually at room or ambient temperature for usually 5 to 30 min., preferably 10 to 15 min. The baking is suitably made at 60° to 200° C., preferably 100° to 150° C., for 1 to 60 min., preferably 10 to 40 min.

The present coating composition can be coated by hot spraying, so that the solvent content of the composition can be further reduced.

Such hot spray can be made so that temperatures between the storage tank for the composition and the portion just before the hot spray is maintained at a prescribed temperature, usually 30° to 80° C., preferably 35° to 70° C.

The present coating composition provides excellent coating properties such as gasoline resistance, scuff resistance, acid resistance and water resistance, as well as improved coating appearance, and reduces the organic solvent content much lower than the conventional ones. For example, the present composition reduces the organic solvent content to 40% or less, preferably 35% or less, much preferably 30% or less. Therefore, the present composition can much reduce the problem of the environmental pollution caused by the release of organic solvents.

The present invention will be explained more detail below, with reference to the working and comparative examples. In this case, the terms "part" and "%" mean those by weight, if otherwise indicated below.

EXAMPLE

[1] Synthesis of oligomers having only an alicyclic epoxy group

Into a four-necked flask with a stirrer, an inlet for introducing an inert gas, a thermometer and a cooler, 674 parts of xylene was introduced and heated to 140° C. and refluxed. Separately, 10% of a mixture comprising 25 parts of a peroxide (Perbutyl 0 manufactured by Nippon Oils & Fats Co., Ltd.) and 40 parts of xylene was then added to a mixture comprising 129 parts of the alicyclic epoxy group-containing methacrylate monomer manufactured by Daisel Ltd. (Cyclomer M-100), 82 parts of butyl acrylate and 39 parts of styrene and they were reacted for one hour. The remaining of the mixture of the peroxide and xylene was dropped over 2 hours. After one hour, a mixture comprising 10 parts of Perbutyl 0 and 10 parts of xylene was then added as an additional catalyst. The reaction was conducted for 2 hours, to produce a 27% resin solution. Xylene was removed from the solution under reduced pressure, to yield Oligomer R1 of the present invention. In the same manner as the above, Oligomers R2 to R11 were produced based on the compositions as described in Table 1 below. In this case, the synthesis was conducted at a reflux temperature, which is a boiling temperature of the refluxing solvent.

In this connection, among the compounds used for producting the oligomers, the compounds indicated by the symbols are as follows:

P 100 means Pegasol 100, which is an aromatic solvent manufactured by Mobile).

M-100 means Cyclomer M-100 which is an alicyclic epoxy group-containing methacrylate monomer (manufactured by Daisel Ltd.) represented by the following formula:

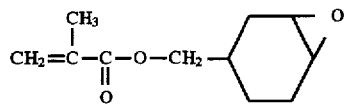

A 200 means Cyclomer A 200 which is an alicyclic epoxy group-containing acrylate monomer (manufactured by Daisel Ltd.) represented by the following formula:

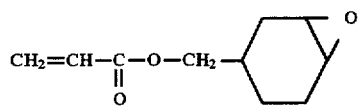

P-0 means a peroxide (manufactured by Nippon Oils & Fats Co., Ltd.) which is t-butylperoxy-2-ethylhexanoate.

BA means butyl acrylate; BMA means butyl methacrylate; ST means styrene; EHMA means 2-ethylhexyl methacrylate; CHMA means cyclohexyl methacrylate; HEMA means 2-hydroxyethyl methacrylate; and HEA means 2-hydroxyethyl acrylate.

AIBN means 2,2'-azobis isobutylonitrile and AIVN means 2,2'-azo valeronitrile.

The Tg's of the oligomers were calculated based on those for the following compounds.

|  | °C. |
|---|---|
| γ-methacryloyloxypropyltrimethoxysilane | 0 |
| trimethoxyethylsilylmethacrylate | −20 |
| Monomer A-1 | 0 |
| Monomer A-2 | 25 |

[2] Synthesis of oligomers having an epoxy group and a silanol group or a hydrolyzable silyl group (1) Synthesis of Macromer A having a hydrolyzable silyl group:

Into a four-necked flask with a stirrer, an inlet for introducing an inert gas, a thermometer and a cooler, there were introduced 1360 parts of methyltrimethoxysilane, 248 parts of γ-methacryloyloxypropyl trimethoxysilane, 1134 parts of deionized water, 2 parts of a 60% sulfuric acid, one part of hydroquine and they were reacted at 80° C. for 5 hours, to produce Macomer A having a number average molecular weight of 936.

(2) The synthesis of the oligomers was conducted in the same manner as the above.

TABLE 1

|  |  | R 1 | R 2 | R 3 | R 4 | R 5 | R 6 | R 7 | R 8 | R 9 | R 10 | R 11 |
|---|---|---|---|---|---|---|---|---|---|---|---|---|
| Mn |  | 720 | 1310 | 681 | 1154 | 686 | 1470 | 2000 | 500 | 700 | 1500 | 1200 |
| Mw |  | 1403 | 2600 | 1350 | 1894 | 1077 | 2508 | 3600 | 900 | 1260 | 2500 | 1800 |
| Mw/Mn |  | 1.95 | 1.98 | 1.98 | 1.64 | 1.57 | 1.71 | 1.8 | 1.8 | 1.8 | 1.7 | 1.5 |
| Tg |  | 23 | 23 | 0 | 11 | 35 | 20 | 13 | 23 | 20 | 13 | 13 |
| Alicyclic epoxy group (mol/kg resin) |  | 3 | 8 | 4 | 2.3 | 3 | 3 | 3 | 3 | 2 | 3 | 3 |
| Reflux solvent | Xylene | 674 | 674 | 1209 | 667 |  | 674 | 674 | 674 | 674 | 674 | 674 |
|  | P100 |  |  |  |  | 585 |  |  |  |  |  |  |
| Monomer mixture | M100 | 129 | 129 |  | 98.9 | 88.1 | 129 | 145 | 129 |  | 145 | 145 |
|  | A200 |  |  | 236.5 |  |  |  |  |  | 117.8 |  |  |
|  | BA | 82 | 82 | 63.55 | 86 | 32.2 | 82 | 73 | 82 |  | 73 | 73 |
|  | BMA |  |  |  | 30.1 |  |  |  |  | 117.8 |  |  |
|  | ST | 39 | 39 |  | 32 | 29 | 39 |  | 39 |  |  |  |
|  | EHMA |  |  | 10.85 |  |  |  | 30 |  | 39.37 | 30 | 30 |
|  | CHMA |  |  |  |  |  |  |  |  | 35.03 |  |  |
| Polymerization | P-O | 30 | 20 | 40 | 25 | 15 | 18 | 12 | 33 | 31 | 18 | 20 |
| catalyst | Xylene | 40 | 40 | 30 | 39 | 13 | 20 | 24 | 24 | 30 | 24 | 24 |
| Additional | P-O | 1 | 1 | 1.55 | 2 | 0.8 | 1 | 4 | 4 | 4 | 4 | 4 |
| catalyst | Xylene | 10 | 20 | 1 | 20 | 2 | 20 | 4 | 4 | 4 | 4 | 4 |

TABLE 2

|  | R 12 | R 13 | R 14 | R 15 | R 16 | R 17 | R 18 | R 19 | R 20 |
|---|---|---|---|---|---|---|---|---|---|
| Mn | 697 | 1890 | 1350 | 500 | 864 | 1890 | 783 | 500 | 2500 |
| Mw | 1257 | 3570 | 2659 | 950 | 1306 | 3140 | 1056 | 1060 | 4750 |

TABLE 2-continued

|  | | R 12 | R 13 | R 14 | R 15 | R 16 | R 17 | R 18 | R 19 | R 20 |
|---|---|---|---|---|---|---|---|---|---|---|
| Mw/Mn | | 1.80 | 1.9 | 1.97 | 1.9 | 1.54 | 1.66 | 1.35 | 2 | 1.9 |
| Tg | | 38 | 28 | Unknown | 22 | 4 | 6 | 4 | −5 | 6 |
| Alicyclic epoxy group (mol/kg resin) | | 1.5 | 1.5 | 3 | 2 | 2 | | | | |
| Hydrolyzable silyl group (silanol group) (mol/kg resin) | | 1.5 | 1.5 | Unknown | 1 | 1 | 3 | 1.5 | 2 | 3 |
| Reflux solvent | Xylene | 674 | 674 | | 674 | | 674 | | 674 | 674 |
| | P100 | | | 765 | | 765 | | 765 | | |
| Monomer Mixture | M100 | 68 | 64 | 96.4 | 97 | 64.3 | | | | |
| | BA | 65 | | 58.6 | 50 | 60 | | 20 | 30 | |
| | BMA | | | | | | | 36.3 | 60 | |
| | ST | 35 | 40 | 20 | 41 | 20 | 20 | 20 | | 20 |
| | EHMA | 42 | 30 | | | 30.1 | | | 36 | |
| | Macromer A | | | 15 | | | | | | |
| | MPTMS * | 30 | 114 | | 62 | 15.6 | 228 | 114 | 124 | 228 |
| Polymerization catalyst | P-O | 34 | 14 | 20 | 33 | 28 | 14 | 22 | 33 | 6 |
| | Xylene | 30 | | 30 | | 30 | | | | |
| | Butyl acetate | | 24 | | 24 | | 24 | 24 | 24 | 24 |
| Additional catalyst | P-O | 1 | 2 | 1 | 4 | 1 | 1 | 1 | 4 | 2 |
| | Xylene | 1 | | 1 | | 1 | | | | |
| | Butyl acetate | | 1 | | 4 | | 1 | 1 | 4 | 2 |

* MPTMS means γ-methacryloyloxypropyl trimethoxy silane.

[3] Synthesis of oligomers having an alicyclic epoxy group and a hydroxyl group or a blocked hydroxyl group, or oligomers having no alicyclic epoxy group and having a hydroxyl group or a blocked hydroxyl group (1) As monomers having a blocked hydroxyl group, Monomers A-1 to A-2 and trimethylsiloxyethyl methacrylate were used. These monomers have the following formulae:

Momoner A-1

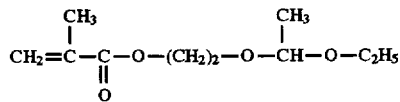

Monomer A-2

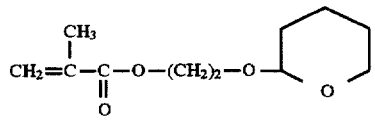

Trimethylsiloxyethyl methacrylate

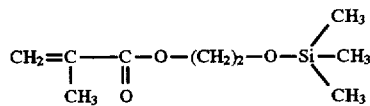

(2) The synthesis of the oligomers was conducted in the same manner as the above.

TABLE 3

| | | R 21 | R 22 | R 23 | R 24 | R 25 | R 26 | R 27 | R 28 | R 29 |
|---|---|---|---|---|---|---|---|---|---|---|
| Mn | | 742 | 1240 | 670 | 670 | 1310 | 785 | 680 | 738 | 1530 |
| Mw | | 1167 | 2350 | 1050 | 1320 | 2280 | 1065 | 1320 | 1153 | 2680 |
| Mw/Mn | | 1.57 | 1.90 | 1.57 | 2 | 1.7 | 1.35 | 1.90 | 1.56 | 1.8 |
| Tg | | 22 | 15 | 22 | 2 | 2 | −9 | 20 | 14 | 20 |
| Alicyclic epoxy group (mol/kg resin) | | | | | | | | 2.2 | 1.4 | 2.2 |
| Hydroxyl group (mol/kg resin) | | 3 | 2.5 | 3 | | | | 1.2 | 1.6 | 1.2 |
| Blocked hydroxyl group (mol/kg resin) | | | | | 3 | 3 | 3 | | | |
| Reflux solvent | Xylene | | 674 | | 674 | 674 | 765 | 1209 | | 1209 |
| | P100 | 765 | | 765 | | | | | 765 | |
| Monomer mixture | M100 | | | | | | | | 50.1 | |
| | A200 | | | | | | | 130 | | 130 |
| | BA | 20 | 50 | 20 | 34 | 34 | 32.3 | 15 | 40 | 15 |
| | BMA | 96.2 | 100 | 96.2 | | | | | | |
| | ST | | 31.2 | | 40 | 40 | 10 | 57 | 15 | 57 |
| | EHMA | | | | 20 | 20 | 30 | 62 | 48.4 | 62 |
| | CHMA | | | | | | | | | |
| | HEMA | 74.1 | 61.8 | 74.1 | | | | | 40.8 | 48 |
| | A-1 | | | | | | 118 | | | |
| | A-2 | | | | | | | | | |
| | HEA | | | | | | | 48 | | |
| | TMSEMA * | | | | 149 | 149 | | | | |
| Polymerization | P-O | 25 | 15 | 26 | 26 | 19 | | 32 | 25 | 11 |

TABLE 3-continued

|  |  | R 21 | R 22 | R 23 | R 24 | R 25 | R 26 | R 27 | R 28 | R 29 |
|---|---|---|---|---|---|---|---|---|---|---|
| catalyst | AIVN |  |  |  |  |  | 11 |  |  |  |
|  | AIBN |  |  |  |  |  | 10 |  |  | 10 |
|  | Butyl acetate | 24 | 24 | 24 | 24 | 24 | 24 | 24 | 19 | 24 |
| Additional | P-O | 1 | 1 | 1 | 4 | 4 |  | 4 | 1 | 4 |
| catalyst | AIBN |  |  |  |  |  | 3 |  |  |  |
|  | Butyl acetate | 1 | 1 | 1 | 4 | 4 | 1 | 4 | 1 | 4 |

\* TMSEMA means trimethylsiloxyethylmethacrylate.

[4] Synthesis of oligomers having an alicyclic epoxy group, a silanol group or a hydrolyzable silyl group and a hydroxyl group or a blocked hydroxyl group The synthesis of the oligomers was conducted in the same manner as the above.

TABLE 4

|  |  | R 30 | R 31 | R 32 | R 33 | R 34 |
|---|---|---|---|---|---|---|
| Mn |  | 650 | 790 | 1450 | 660 | 1500 |
| Mw |  | 1570 | 1198 | 2750 | 1550 | 2890 |
| Mw/Mn |  | 2.4 | 1.51 | 1.9 | 2.3 | 1.9 |
| Tg |  | 12 | 21 | 12 | 5 | 5 |
| Alicyclic epoxy group (mol/kg resin) |  | 1.9 | 1.9 | 1.9 | 0.9 | 0.9 |
| Hydroxyl group (mol/kg resin) |  |  |  |  | 1.1 | 1.1 |
| Blocked hydroxyl group (mol/kg resin) |  | 1 | 1 | 1 | 1 | 1 |
| Reflux solvent | Xylene | 765 | 765 | 765 | 765 | 765 |
|  | P100 |  |  |  |  |  |
| Monomer mixture | M100 | 66.9 | 66.9 | 66.9 | 33.5 | 33.5 |
|  | A200 |  |  |  |  |  |
|  | BA | 30 | 33.5 | 30 | 30 | 30 |
|  | BMA |  |  |  |  |  |
|  | ST | 10 | 10 | 10 | 10 | 10 |
|  | EHMA | 40 | 10 | 40 | 38 | 38 |
|  | CHMA |  |  |  |  |  |
|  | HEMA |  |  |  | 35 | 35 |
|  | A-1 |  |  |  |  |  |
|  | A-2 |  | 68.9 |  |  |  |
|  | TMSEMA | 42.5 |  | 42.5 | 42 | 42 |
|  | HEA |  |  |  |  |  |
| Polymerization | P-O | 25 |  | 16 | 26 | 16 |
| catalyst | AIBN |  | 10 |  |  |  |
|  | AIVN |  | 11 |  |  |  |
|  | Butyl acetate | 24 | 24 | 24 | 24 | 24 |
| Additional | P-O | 4 |  | 4 | 4 | 4 |
| catalyst | AIBN |  | 3 |  |  |  |
|  | Butyl acetate | 4 | 1 | 4 | 4 | 4 |

TABLE 5

|  |  | R 35 | R 36 | R 37 | R 38 | R 39 | R 40 | R 41 |
|---|---|---|---|---|---|---|---|---|
| Mn |  | 735 | 730 | 743 | 739 | 640 | 1230 | 1065 |
| Mw |  | 1075 | 1086 | 1063 | 1038 | 1280 | 2540 | 2048 |
| Mw/Mn |  | 1.46 | 1.49 | 1.43 | 1.4 | 2 | 2.1 | 1.92 |
| Tg |  | 5 | 16 | 5 | −21 | 12 | 12 | 3 |
| Alicyclic epoxy group (mol/kg resin) |  | 2 | 2 | 2 |  |  |  | 1 |
| Hydroxyl group (mol/kg resin) |  |  |  | 1 | 0.5 | 2 | 2 |  |
| Blocked hydroxyl group (mol/kg resin) |  | 1 | 1 |  | 2.5 | 1 | 1 | 1 |
| Hydrolyzable silyl group (silanol gourp) (mol/kg resin) |  | 0.5 | 0.5 | 0.5 |  |  |  | 0.5 |
| Reflux solvent | Xylene | 765 | 765 |  |  | 674 | 674 | 765 |
|  | P100 |  |  | 765 | 765 |  |  |  |
| Monomer mixture | M100 | 64.3 | 64.3 | 64.3 |  |  |  | 32.2 |
|  | BA | 40 |  | 60 | 50 | 50 | 50 | 40.6 |
|  | BMA |  | 25.4 |  |  |  |  |  |
|  | ST |  |  | 3.4 | 11.9 | 50 | 50 | 16.5 |
|  | EHMA | 8.7 |  |  | 20 | 30 | 30 |  |
|  | HEMA |  |  | 24.7 | 12.4 | 63 | 63 | 24.7 |
|  | A-1 | 39.4 |  |  |  |  |  |  |

TABLE 5-continued

|  |  | R 35 | R 36 | R 37 | R 38 | R 39 | R 40 | R 41 |
|---|---|---|---|---|---|---|---|---|
|  | A-2 |  | 62.7 |  |  |  |  |  |
|  | TMSEMA |  |  |  | 96 | 50 | 50 | 38.4 |
|  | MPTMS | 37.9 | 37.9 | 37.9 |  |  |  | 37.9 |
| Polymerization | P-O |  |  | 25 | 25 | 26 | 19 | 25 |
| catalyst | AIVN | 11 | 11 |  |  |  |  |  |
|  | AIBN | 10 | 10 |  |  |  |  |  |
|  | Butyl acetate | 24 | 24 | 24 | 24 | 24 | 24 | 24 |
| Additional | P-O |  |  | 1 |  | 4 | 4 | 1 |
| catalyst | AIBN | 2 | 2 |  | 2 |  |  |  |
|  | Butyl acetate | 1 | 1 | 1 | 1 | 4 | 4 | 1 |

[5] Synthesis of oligomers having a hydroxyl group or a blocked hydroxyl group or a silanol group or a hydrolyzable silyl group As the monomers having a blocked hydroxyl group, Monomers A-1 to A-2 and trimethylsiloxyethyl methacrylate were used.

The synthesis of the oligomers was conducted in the same manner as the above.

TABLE 6

|  |  | R 42 | R 43 | R 44 | R 45 |
|---|---|---|---|---|---|
| Mn |  | 1130 | 1051 | 1071 | 1063 |
| Mw |  | 1703 | 1863 | 1631 | 1712 |
| Mw/Mn |  | 1.51 | 1.77 | 1.52 | 1.61 |
| Tg |  | 9 | −3 | −8 | 2 |
| Hydroxyl group (mol/kg resin) |  | 1.5 |  |  | 1 |
| Blocked hydroxyl group (mol/kg resin) |  |  | 1.5 | 1.5 | 1 |
| Hydrolyzable silyl group (silanol group) (mol/kg resin) |  | 1.5 | 1.5 | 1.5 | 1 |
| Reflux solvent | Xylene | 667 | 667 | 667 | 667 |
|  | P100 |  |  |  |  |
| Monomer mixture | BA |  | 20 | 17 |  |
|  | BMA | 20 | 10 |  |  |
|  | ST | 10 | 7 |  | 13 |
|  | EHMA | 36.9 | 10 |  | 20 |
|  | CHMA |  |  |  |  |
|  | HEMA | 32.1 |  |  | 16 |
|  | A-1 |  | 51.2 |  |  |
|  | A-2 |  |  | 82 |  |
|  | TMSEMA |  |  |  | 50 |
|  | MPTMS | 148 | 148 | 148 | 148 |
| Polymerization | P-O | 25 |  |  | 25 |
| catalyst | AIVN |  | 13 | 13 |  |
|  | AIBN |  | 15 | 15 |  |
|  | Butyl acetate | 39 | 39 | 39 | 39 |
| Additional | P-O | 2 |  |  | 2 |
| catalyst | AIBN |  | 4 | 4 |  |
|  | Butyl acetate | 2 | 2 | 2 | 2 |

The above acrylic ligomers having a blocked hydroxyl group blocked with vinyl ether or-pyran were prepared in the following manner.

Into a four-necked flask with a stirrer, an inlet for introducing an inert gas, a thermometer and a cooler, 765 parts of xylene was introduced and heated to 80° C. Separately, 10 parts of 2,2'-azobis isobutylonitrile, 11 parts of 2,2'-azobis valeronitrile and 24 parts of butyl acetate were added to a monomer mixture comprising 66.9 parts of Cyclomer M-100, 30 parts of butyl acrylate, 10 parts of styrene, 39.8 parts of 2-ethylhexyl acrylate and 42.6 parts of Monomer A-1, and then they were added to the flask over 2 hours. After the completion of the addition, the reaction mixture was maintained at 80° C. for one hour.

Then, 3 parts of 2,2'-azobis valeronitrile and one part of butyl acetate were additionally added to the flask and the flask was maintained at 80° C. for 4 hours, to finish the reaction.

In this connection, the addition conditions of the monomer mixture were modified as follows, in order to adjust the molecular weight of the oligomers.

(1) Addition of monomer mixture+polymerization initiator over 6 hours with the same speed:

R11, R18, R26, R35, R37 and R38

(2) Addition of monomer mixture+polymerization initiator over 2 hours with the same speed:

R4-6, R16-17, R21, R23, R25, R28, R31 and R42-45

(3) Addition of monomer mixture+10% of polymerization initiator with refluxing solvent, followed by reaction for one hour, then followed by addition of the remaining portion over 2 hours with the same speed:

R1-3, R7-15, R19-20, R22, R24, R27, R29, R32, R34, R39 and R40-41

(4) Addition of monomer mixture+20% of polymerization initiator with refluxing solvent, followed by reaction for one hour, then followed by addition of the remaining portion over 2 hours with the same speed:

R30 and R33

[6] Synthesis of polyester oligomer having an alicyclic epoxy group

The oligomers having an alicyclic epoxy group were synthesized using Monomers D, E and F as follows and based on the formulations shown in Table 6 below.

AOEX 24 (manufactured by Daisel Ltd.) is an α-olefin epoxide as represented by the following formula:

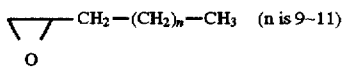

More specifically, with respect to P1, into a four-necked flask with a stirrer, an inlet for introducing an inert gas, a thermometer and a cooler, 300 parts of methylisobutyl ketone and 218 parts of pyromellitic anhydride were introduced and heated to 100° C. Then, 540 parts of Monomer E was dropped into the flask over with a dropping funnel and the reaction was conducted at 100° C. for one hour. Then, 392 parts of AOEX 24 and one part of dimethyl imidazole were added to the flask over 30 min. with a dropping funnel and the reaction was continued for 2 hours at a reflux temperature of methylisobutyl ketone. After the synthesis, the solvent was removed under the reduced pressure.

P2-8 were prepared in the same manner as above. In this connection, in case where caprolactone was used, caprolactone and tetrabutyl titanate were dropped over 10 min. and the reaction was conducted at a reflux temperature for 2 hours, after the reaction of the epoxy compound.

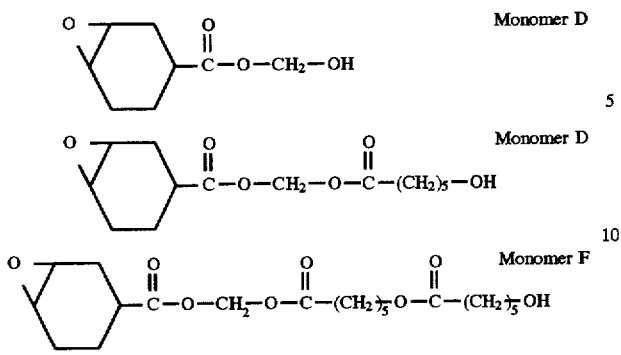

Burnock 901 S is hexamethylene diisocyanate prepolymer manufactured by Dainippon Ink & Chemicals, Inc.

Byketol-OK is an acrylic surfactant manufactured by BYK Japan.

MG 100S is microgel manufactured by Dainippon Ink & Chemicals, Inc.

606 C is aluminium paste manufactured by Asahi Chemical Industry Co., Ltd.

Further, H-1 and H-2 are hydroxyl group-containing oligoesters and prepared by the following formulations.

TABLE 7

| | | P1 | P2 | P3 | P4 | P5 | P6 | P7 | P8 |
|---|---|---|---|---|---|---|---|---|---|
| 1 | Methylbutylketone | 300 | 300 | 300 | 300 | 300 | 300 | 300 | 300 |
| | Pyromellitic anhydride | 218 | | | 218 | | | 218 | 218 |
| | Trimellitic anhydride | | | | | 192 | | | |
| | 4-methylhexahydrophthalic anhydride | | 168 | 168 | | | 168 | | |
| | Monomer D | | | | 312 | 312 | 156 | | |
| | Monomer E | 540 | 270 | 270 | | | | 540 | |
| | Monomer F | | | | | | | | 776 |
| 2 | AOEX2 4 | 392 | 196 | 196 | 392 | 392 | | | |
| | Dimethylimidazole | 1 | 1 | 1 | 1 | 1 | 1 | 1 | 1 |
| | ε-caprolactone | | | 114 | 228 | 228 | | 798 | 684 |
| | Glycidol | | | | | | 74 | 148 | 74 |
| | Tetrabutyltitanate | | | 1 | 1 | | | 1 | 1 |
| | Mn | 1210 | 710 | 785 | 1240 | 1360 | 406 | 1770 | 1832 |
| | Mw | 1630 | 990 | 1334 | 1980 | 2448 | 532 | 2830 | 3320 |
| | Mw/Mn | 1.4 | 1.4 | 1.7 | 1.6 | 1.8 | 1.3 | 1.6 | 1.8 |
| | Total amount of functional group (mol/kg resin) | 3.5 | 3.2 | 2.7 | 3.5 | 3.1 | 7.5 | 3.5 | 3.4 |

Production of Coating Composition

The compounds indicated by trade names or symbols are as follows:

San-aid SIL 110 and H 40 are onium salts (ammonium salts) manufactured by Sanshin Chemical Industries, Co., Ltd.).

KP 321 is a silicon-type surfactant manufactured by The Shin-Etsu Chemical Co., Ltd.

Sanduvor 3206 is a ultraviolet ray-absorber manufactured by Sandoz.

Sanduvor 3058 is a hindered amine light stabilizer manufactured by Sandoz.

Cymel 303 is completely alkoxylated monomeric melamine manufactured by Mitsui Cyanamide.

Cymel 370 is methylolated monomeric melamine manufactured by Mitsui Cyanamide.

Cymel 325 is iminized monomeric melamine manufactured by Mitsui Cyanamide.

Celloxide 2021 is an alicyclic epoxy group-containing compound manufactured by Daisel Ltd. and represented by the following formula:

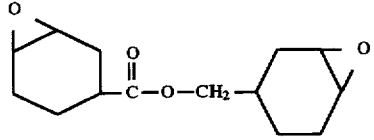

Celloxide 2081 is an alicyclic epoxy group-containing compound which is Celloxide 2021 modified by εcaprolactone and manufactured by Daisel Ltd.

TSL 8350 is γ-glycidoxy propyl trimethoxysilane manufactured by Toshiba Silicon Co., Ltd.

| | H1 | H2 |
|---|---|---|
| (A) Methylisobutyl ketone | 300 | 300 |
| Cyclohexane dimethanol | | |
| Trimethylol propane | 144 | 134 |
| (B) ε-caprolactone | 228 | 342 |
| Tetrabutyl titanate | 1 | 1 |

Into a four-necked flask with a stirrer, a thermometer and a dropping funnel, the component (A) was introduced and heated to a reflux temperature. Then, the component (B) was dropped to the flask over one hour and the reaction was conducted at the reflux temperature for 2 hours. After the synthesis, methylisobutyl ketone was distilled off by an evaporator, to produce H-1 and H-2. H-3 is a blocked hydroxyl group-containing oligoester and was prepared based on the following formulation.

| | H-3 |
|---|---|
| Methylethyl ketone | 200 |
| H-2 | 100 |
| Ethylvinyl ether | 46 |
| 35% Hydrochloric acid | 0.2 |

Into a four-necked flask with a stirrer, a thermometer, a dropping funnel and an inlet for introducing an inert gas, a mixture having the above formulation was introduced, and stirred at 50° C. for 24 hr. After the completion of the reaction, the resultant material was transferred to a separation funnel, where it was alkali-washed with 100 parts of a 10 wt. % sodium hydrogen carbonate aqueous solution and 100 parts of saturated salt water. After the washed material was left to stand, the water phase was removed. This procedure was repeated 20 times. Then, the washed material was washed with 100 parts of saturated salt water three times. Then, sodium sulfate was added to the organic phase, which was dried at room temperature for 3 days, to produce H-3.

[1] Preparation of clear coating composition

In case where acrylic oligomers are used:

The acrylic oligomers as produced above were used to prepare clear coating compositions based on the formulations as shown in the tables below.

(1) In case where oligomers having only an alicyclic epoxy group are used

TABLE 8

|  | C1 | C2 | C3 | C4 | C5 | C6 | C7 | C8 | C9 | C10 | C11 |
|---|---|---|---|---|---|---|---|---|---|---|---|
| R 1 | 100 | | | | | | | | | | |
| R 2 | | 100 | | | | | | | | | |
| R 3 | | | 100 | | | | | | | | |
| R 4 | | | | 100 | | | | | | | |
| R 5 | | | | | 100 | | | | | | |
| R 6 | | | | | | 100 | | | | | |
| R 7 | | | | | | | 100 | | | | |
| R 8 | | | | | | | | 100 | | | |
| R 9 | | | | | | | | | 100 | | |
| R 10 | | | | | | | | | | 100 | |
| R 11 | | | | | | | | | | | 100 |
| San-aid L100 | 2 | 2 | 2 | | | | | | | 2 | 2 |
| N-benzyl-N,N-dimethylanilinium hexafluoroantimonate | | | | 2 | 2 | | 2 | 2 | | | |
| Dimethyl-p-hydroxyphenylsulfonium antimonate | | | | | | 3 | | | 3 | | |
| Acetone | 2 | 2 | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

(2) In case where oligomers having an alicyclic epoxy group, a silanol group or a hydrolyzable silyl group are used

TABLE 9

|  | C12 | C13 | C14 | C15 | C16 | C17 | C18 | C19 | C20 |
|---|---|---|---|---|---|---|---|---|---|
| R 12 | 100 | | | | | | | | |
| R 13 | | 100 | | | | | | | |
| R 14 | | | 100 | | | | | | |
| R 15 | | | | 100 | | | | | |
| R 16 | | | | | 100 | | | | |
| R 17 | | | | | | 50 | | | |
| R 20 | | | | | | | 50 | | |
| R 18 | | | | | | | | | 50 |
| R 19 | | | | | | | 50 | | |
| R 4 | | | | | | | | | 50 |
| R 7 | | | | | | | | 50 | |
| R 10 | | | | | | 50 | | | |
| R 9 | | | | | | | | 50 | |
| Trisacetylacetonate aluminium | 2 | 2 | 2 | 2 | 2 | 2 | 2 | 2 | 2 |
| Acetone | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 |

(3) In case where oligomers having an alicyclic epoxy group, a hydroxyl group or a blocked hydroxyl group are used

TABLE 10

|  | C21 | C22 | C23 | C24 | C25 | C26 | C27 | C28 | C29 |
|---|---|---|---|---|---|---|---|---|---|
| R 1 | | | | | 50 | | | | 50 |
| R 3 | | | 50 | | | | | 50 | |
| R 7 | | 50 | | | | | 50 | | |
| R 10 | 50 | | | | | 50 | | | |
| R 9 | | | | | 50 | | | | |
| R 21 | | | | 50 | 50 | | | | |
| R 22 | | 50 | 50 | | | | | | |

TABLE 10-continued

| | C21 | C22 | C23 | C24 | C25 | C26 | C27 | C28 | C29 |
|---|---|---|---|---|---|---|---|---|---|
| R 23 | | | | | 50 | | | | |
| R 24 | | | | | | | | 50 | |
| R 25 | | | | | | 50 | 50 | | |
| R 26 | | | | | | | | | 50 |
| San-aid SIL 110 | 2 | 2 | 2 | | | | | | |
| N-benzyl-N,N-dimethylanilinium hexafluoroantimonate | | | | 2 | 2 | | 2 | 2 | |
| Dimethyl-p-hydroxyphenylsulfonium antimonate | | | | | | 3 | | | 3 |
| Acetone | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 |

(4) In case where oligomers having an alicyclic epoxy group, a silanol group or a hydrolyzable silyl group, or a hydroxyl group or a blocked hydroxyl group are used

TABLE 11

| | C30 | C31 | C32 | C33 | C34 | C35 | C36 | C37 | C38 | C39 | C40 |
|---|---|---|---|---|---|---|---|---|---|---|---|
| R 1 | | 50 | | | | | | | | | |
| R 3 | 50 | | | | | | | | | | |
| R 7 | | | 50 | | | | | | | | |
| R 12 | | | | | 50 | | | 50 | | | |
| R 13 | | | | | | | 50 | | | | |
| R 14 | | | | | | | 50 | | | | 50 |
| R 15 | | | | 50 | | | | | | | |
| R 16 | | | | | | | | | 50 | 50 | |
| R 21 | | 25 | | 50 | 50 | | | | | | |
| R 22 | | | 25 | | | | 50 | 50 | | | |
| R 23 | 25 | | | | | | 50 | | | | |
| R 24 | 25 | | | | | | | | 50 | | |
| R 25 | | | 25 | | | | | | | 50 | |
| R 26 | | 25 | | | | | | | | | 50 |
| San-aid SIL 110 | | | 2 | | | | | | | | |
| N-benzyl-N,N-dimethylanilinium hexafluoroantimonate | | 2 | | | | | | | | | |
| Dimethyl-p-hydroxyphenylsulfonium antimonate | 2 | | | | | | | | | | |
| Monooctyl phosphate | | | | | | | | | 1 | 1 | 1 |
| Trisacetylacetonate aluminiumn | | | | 2 | 2 | 2 | 2 | 2 | 2 | 2 | 2 |
| Acetone | 2 | 2 | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

TABLE 12

| | C41 | C42 | C43 | C44 | C45 | C46 | C47 | C48 | C49 | C50 | C51 |
|---|---|---|---|---|---|---|---|---|---|---|---|
| R 12 | 60 | | | | | | | | | | |
| R 13 | | | 80 | | | | | | | | |
| R 14 | | 80 | | | | | | | | | |
| R 9 | | | | 60 | | | | | | | |
| R 3 | | | | | 60 | | | 60 | | | |
| R 1 | | | | | | 60 | | | 60 | | |
| R 7 | | | | | | | 60 | | | 60 | |
| R 10 | | | | | | | | 60 | | | |
| R 19 | | | | 20 | 20 | | | 20 | | | |
| R 17 | | | | | | 20 | 20 | | | 20 | |
| R 18 | | | | | 20 | | | | 20 | | |
| R 21 | 20 | | | 20 | 20 | | | | | | |
| R 22 | | | 10 | | 20 | | | | | | |
| R 23 | | 10 | | | | 20 | 20 | | | | |
| R 24 | 20 | | | | | | | | 20 | | |
| R 26 | | 10 | | | | | | | 20 | | |
| R 25 | | | 10 | | | | | | | | 20 |
| Monooctyl phosphate | 1 | 1 | 1 | | | | | | 1 | 1 | 1 |
| Trisacetylacetonate aluminium | 2 | 2 | 2 | 2 | 2 | 2 | 2 | 2 | 2 | 2 | 2 |
| Acetone | 2 | 2 | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 | 0.5 | 0.5 |

TABLE 12-continued

|  | C41 | C42 | C43 | C44 | C45 | C46 | C47 | C48 | C49 | C50 | C51 |
|---|---|---|---|---|---|---|---|---|---|---|---|
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

TABLE 13

|  | C52 | C53 | C54 | C55 | C56 | C57 | C58 | C59 | C60 |
|---|---|---|---|---|---|---|---|---|---|
| R 3 | 70 | | | | | | | | |
| R 1 | | 70 | | | | | | | |
| R 7 | | | 70 | | | | | | |
| R 19 | 10 | | | | | | | | |
| R 17 | | | 10 | | | | | | |
| R 18 | | 10 | | | | | | | |
| R 21 | 10 | | | | | | | | |
| R 22 | | 10 | | | | | | | |
| R 23 | | | 10 | | | | | | |
| R 24 | 10 | | | | | | | | |
| R 26 | | 10 | | | | | | | |
| R 25 | | | 10 | | | | | | |
| R 27 | | | | 100 | | | | | |
| R 28 | | | | | 100 | | | | |
| R 29 | | | | | | 100 | | | |
| R 30 | | | | | | | 100 | | |
| R 31 | | | | | | | | 100 | |
| R 32 | | | | | | | | | 100 |
| San-aid SIL 110 | | | | 2 | 2 | 2 | 2 | | |
| San-aid H 40 | | | | | | | | 2 | |
| N-benzyl-N,N-dimethylanilinium hexafluoroantimonate | | | | | | | | | 3 |
| Monooctyl phosphate | 1 | 1 | 1 | | | | | | |
| Trisacetylacetonate aluminium | 2 | 2 | 2 | | | | | | |
| Acetone | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 |

TABLE 14

|  | C61 | C62 | C63 | C64 | C65 | C66 | C67 | C68 | C69 | C70 | C71 |
|---|---|---|---|---|---|---|---|---|---|---|---|
| R 33 | 100 | | | | | | | | | | |
| R 34 | | 100 | | | | | | | | | |
| R 35 | | | 100 | | | | | | | | |
| R 36 | | | | 100 | | | | | | | |
| R 37 | | | | | 100 | | | | | | |
| R 1 | | | | | | | | | 50 | | |
| R 3 | | | | | | | | 50 | | | |
| R 7 | | | | | | | 50 | | | | |
| R 38 | | | | | | | | 50 | | 50 | |
| R 39 | | | | | | | 50 | | 50 | | |
| R 40 | | | | | | 50 | | | | | 50 |
| R 12 | | | | | | | | | 50 | | |
| R 14 | | | | | | | | | | | 50 |
| R 16 | | | | | | | | | | 50 | |
| San-aid SIL 110 | | | 2 | 2 | | 2 | | | | | |
| N-benzyl-N,N-dimethylanilinium hexafluoroantimonate | | 2 | | | | | 2 | 2 | | | |
| Dimethyl-p-hydroxyphenylsulfonium antimonate | 3 | | | | | | | | | | |
| Monooctyl phosphate | | | | | | | | | 1 | 1 | 1 |
| Trisacetylacetonate aluminium | | | 2 | 2 | 2 | 2 | 2 | 2 | 2 | 2 | 2 |
| Acetone | 2 | 2 | 2 | 2 | 2 | 2 | 2 | 2 | 2 | 2 | 2 |
| KP 381 | 0.5 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

TABLE 15

|                              | C72 | C73 | C74 | C75 | C76 | C77 | C78 | C79 | C80 | C81 | C82 |
|------------------------------|-----|-----|-----|-----|-----|-----|-----|-----|-----|-----|-----|
| R 41                         | 100 |     |     |     |     |     |     |     |     |     |     |
| R 27                         |     | 70  |     |     | 70  |     |     | 50  |     |     |     |
| R 19                         |     | 30  |     |     |     |     |     |     |     |     |     |
| R 29                         |     |     | 70  | 70  |     |     | 70  |     |     | 50  |     |
| R 18                         |     |     | 30  |     |     |     |     |     |     |     |     |
| R 42                         |     |     |     | 30  |     |     |     |     |     |     | 50  |
| R 28                         |     |     |     |     |     | 70  |     |     | 50  |     |     |
| R 43                         |     |     |     |     | 30  | 30  |     |     |     |     |     |
| R 44                         |     |     |     |     |     |     | 30  |     |     |     |     |
| R 45                         |     |     |     |     |     |     |     | 50  | 50  | 50  |     |
| R 30                         |     |     |     |     |     |     |     |     |     |     | 70  |
| R 15                         |     |     |     |     |     |     |     |     |     |     | 30  |
| Aluminium triethoxide        |     |     |     | 2   | 2   | 2   |     |     |     |     |     |
| Trisacetylacetonate aluminium| 2   | 2   | 2   |     |     |     | 2   | 2   | 2   | 2   | 2   |
| Monooctyl phosphate          | 1   |     |     |     | 1   | 1   | 1   | 1   | 1   | 1   | 1   |
| Acetone                      | 2   | 2   | 2   | 2   | 2   | 2   | 2   | 2   | 2   | 2   | 2   |
| KP 321                       | 0.5 | 0.5 | 0.5 | 0.5 | 0.5 | 0.5 | 0.5 | 0.5 | 0.5 | 0.5 | 0.5 |
| Sanduvor 3206                | 1   | 1   | 1   | 1   | 1   | 1   | 1   | 1   | 1   | 1   | 1   |
| Sanduvor 3058                | 0.5 | 0.5 | 0.5 | 0.5 | 0.5 | 0.5 | 0.5 | 0.5 | 0.5 | 0.5 | 0.5 |

TABLE 16

|                              | C83 | C84 | C85 | C86 | C87 | C88 | C89 | C90 | C91 | C92 |
|------------------------------|-----|-----|-----|-----|-----|-----|-----|-----|-----|-----|
| R 30                         |     |     | 70  | 70  |     |     | 70  |     |     |     |
| R 31                         | 70  |     |     |     | 70  |     |     | 70  |     | 70  |
| R 32                         |     | 70  |     |     |     | 70  |     |     | 70  |     |
| R 18                         | 30  |     |     |     |     |     |     |     |     |     |
| R 20                         |     | 30  |     |     |     |     |     |     |     |     |
| R 17                         |     |     | 30  |     |     |     |     |     |     |     |
| R 42                         |     |     |     | 30  | 30  | 30  |     |     |     |     |
| R 43                         |     |     |     |     |     |     | 30  | 30  | 30  |     |
| R 45                         |     |     |     |     |     |     |     |     |     | 30  |
| Monooctyl phosphate          | 1   | 1   | 1   | 1   | 1   | 1   | 1   | 1   | 1   | 1   |
| Trisacetylacetonate aluminium| 2   | 2   | 2   | 2   | 2   | 2   | 2   | 2   | 2   | 2   |
| Acetone                      | 2   | 2   | 2   | 2   | 2   | 2   | 2   | 2   | 2   | 2   |
| KP 321                       | 0.5 | 0.5 | 0.5.| 0.5 | 0.5 | 0.5 | 0.5 | 0.5 | 0.5 | 0.5 |
| Sanduvor 3206                | 1   | 1   | 1   | 1   | 1   | 1   | 1   | 1   | 1   | 11  |
| Sanduvor 3058                | 0.5 | 0.5 | 0.5 | 0.5 | 0.5 | 0.5 | 0.5 | 0.5 | 0.5 | 0.5 |

TABLE 17

|                              | C93 | C94 | C95 | C96 | C97 | C98 | C99 | C100 | C101 |
|------------------------------|-----|-----|-----|-----|-----|-----|-----|------|------|
| R15                          | 90  |     |     | 90  |     |     | 90  |      |      |
| R12                          |     | 90  |     |     | 90  |     |     | 90   |      |
| R13                          |     |     | 90  |     |     | 90  |     |      | 90   |
| R19                          | 10  | 10  |     |     |     |     |     |      |      |
| R20                          |     |     | 10  |     |     |     |     |      |      |
| R42                          |     |     |     | 10  | 10  | 10  |     |      |      |
| R43                          |     |     |     |     |     |     | 10  | 10   | 10   |
| Monooctyl phosphate          |     |     |     |     |     |     | 1   | 1    | 1    |
| Trisacetylacetonate aluminium| 2   |     |     | 2   | 2   | 2   | 2   | 2    | 2    |
| Tetrabutyl titanate          |     | 4   | 4   |     |     |     |     |      |      |
| Acetone                      | 2   | 2   | 2   | 2   | 2   | 2   | 2   | 2    | 2    |
| KP 321                       | 0.5 | 0.5 | 0.5 | 0.5 | 0.5 | 0.5 | 0.5 | 0.5  | 0.5  |
| Sanduvor 3206                | 1   | 1   | 1   | 1   | 1   | 1   | 1   | 1    | 1    |
| Sanduvor 3058                | 0.5 | 0.5 | 0.5 | 0.5 | 0.5 | 0.5 | 0.5 | 0.5  | 0.5  |

TABLE 18

|     | C102 | C103 | C104 | C105 | C106 | C107 | C108 | C109 | C110 | C111 |
|-----|------|------|------|------|------|------|------|------|------|------|
| R15 | 70   |      |      |      |      |      |      |      |      |      |
| R12 |      | 70   |      |      |      |      |      |      |      |      |
| R13 |      |      | 70   |      |      |      |      |      |      |      |
| R45 | 30   | 30   | 30   |      |      |      |      | 20   |      |      |
| R33 |      |      |      | 80   | 100  | 80   | 80   | 80   |      |      |
| R18 |      |      |      | 20   |      |      |      |      | 20   |      |
| R31 |      |      |      |      |      | 20   |      |      |      |      |

TABLE 18-continued

|  | C102 | C103 | C104 | C105 | C106 | C107 | C108 | C109 | C110 | C111 |
|---|---|---|---|---|---|---|---|---|---|---|
| R43 |  |  |  |  |  |  | 20 |  |  | 20 |
| R35 |  |  |  |  |  |  |  |  | 80 | 80 |
| Monooctyl phosphate | 1 | 1 | 1 | 1 | 1 | 1 | 1 | 1 | 1 | 1 |
| Trisacetylacetonate aluminium | 2 | 2 |  | 2 | 2 | 2 | 2 | 2 | 2 | 2 |
| Tetrabutyl zirconate |  |  | 4 |  |  |  |  |  |  |  |
| Acetone | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 |
| Diphenyl dimethoxy silane |  |  |  |  | 3 | 3 |  |  |  |  |
| Sanduvor 3206 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 |

TABLE 19

|  | C112 | C113 | C114 | C115 | C116 | C117 | C118 | C119 | C120 | C121 |
|---|---|---|---|---|---|---|---|---|---|---|
| R35 | 80 | 80 | 80 | 80 |  |  |  |  |  |  |
| R18 |  |  | 20 |  | 20 |  |  |  |  |  |
| R43 |  |  |  | 20 |  | 20 |  |  |  |  |
| R42 | 20 |  |  |  |  |  | 20 |  |  |  |
| R45 |  | 20 |  |  |  |  |  | 20 |  |  |
| R37 |  |  |  |  | 80 | 80 | 80 | 80 |  |  |
| R28 |  |  |  |  |  |  |  |  | 80 | 80 |
| R22 |  |  |  |  |  |  |  |  | 20 | 20 |
| San-aid SIL 110 |  |  |  |  |  |  |  |  | 2 |  |
| Monooctyl phosphate | 1 | 1 | 1 | 1 |  | 1 |  | 1 |  |  |
| Trisacetylacetonate aluminium | 2 |  | 2 | 2 | 2 | 2 | 2 |  |  |  |
| Tetraquis acetylacetonate zirconium |  | 4 |  |  |  |  |  |  |  |  |
| Bis acetylacetonate titanate |  |  |  |  |  |  |  | 4 |  |  |
| Phenyl trimethoxy silane |  |  |  |  |  |  |  |  |  | 4 |
| Acetone | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 |
| Diphenyl dimethoxy silane |  |  |  | 3 |  |  |  |  |  |  |
| Sanduvor 3206 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 |

TABLE 20

|  | C122 | C123 | C124 | C125 | C126 | C127 | C128 | C129 | C130 | C131 | C132 |
|---|---|---|---|---|---|---|---|---|---|---|---|
| R23 |  | 20 |  | 20 |  | 20 |  | 20 |  |  |  |
| R31 | 80 |  |  |  |  |  |  |  |  |  |  |
| R38 | 20 |  | 20 |  | 20 |  | 20 |  | 20 |  |  |
| R12 |  | 80 | 80 |  |  |  |  |  |  |  |  |
| R45 |  |  |  | 80 | 80 |  |  |  |  |  |  |
| R37 |  |  |  |  |  | 80 | 80 |  |  |  |  |
| R35 |  |  |  |  |  |  |  | 80 | 80 |  |  |
| R28 |  |  |  |  |  |  |  |  |  | 80 | 80 |
| R20 |  |  |  |  |  |  |  |  |  | 20 |  |
| R43 |  |  |  |  |  |  |  |  |  |  | 20 |
| San-aid SIL 110 | 2 |  |  |  |  |  |  |  |  |  |  |
| Monooctyl phosphate | 1 |  | 1 | 1 | 1 |  | 1 | 1 | 1 |  | 1 |
| Trisacetylacetonate aluminium |  | 2 | 2 | 2 | 2 | 2 | 2 | 2 | 2 | 2 | 2 |
| Acetone | 2 | 2 | 2 | 2 | 2 | 2 | 2 | 2 | 2 | 4 | 2 |
| KP 321 | 0.5 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

TABLE 21

|  | C133 | C134 | C135 | C136 | C137 | C138 | C139 | C140 | C141 | C142 | C143 |
|---|---|---|---|---|---|---|---|---|---|---|---|
| R43 |  | 20 |  | 20 |  | 20 |  |  |  |  |  |
| R31 | 80 | 80 |  |  |  |  |  |  |  |  |  |
| R26 | 20 |  | 20 |  | 20 |  |  |  |  |  |  |
| R16 |  |  | 80 | 80 |  |  |  |  |  |  |  |
| R33 |  |  |  |  | 80 | 80 |  |  |  |  |  |
| R35 |  |  |  |  |  |  | 80 | 80 |  |  |  |
| R38 |  |  |  |  |  |  | 20 |  | 20 |  |  |
| R28 |  |  |  |  |  |  |  | 20 | 80 | 20 |  |
| R26 |  |  |  |  |  |  |  |  |  | 80 | 80 |

TABLE 21-continued

|  | C133 | C134 | C135 | C136 | C137 | C138 | C139 | C140 | C141 | C142 | C143 |
|---|---|---|---|---|---|---|---|---|---|---|---|
| R41 |  |  |  |  |  |  |  |  |  |  | 20 |
| San-aid SIL 110 | 2 | 2 |  |  | 2 | 2 |  |  | 2 | 2 |  |
| Monooctyl phosphate |  | 1 | 1 | 1 | 1 | 1 | 1 | 1 | 1 | 1 | 1 |
| Trisacetylacetonate aluminium |  | 2 | 2 | 2 |  | 2 | 2 | 2 | 2 | 2 | 2 |
| Acetone | 2 | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 | 0.5 |

TABLE 22

|  | C144 | C145 | C146 | C147 | C148 | C149 | C150 | C151 | C152 | C153 |
|---|---|---|---|---|---|---|---|---|---|---|
| R1 | 100 |  |  |  |  |  |  |  |  |  |
| R7 |  | 100 |  |  |  |  |  |  |  |  |
| R10 |  |  | 100 |  |  |  |  |  |  |  |
| R12 |  |  |  | 100 |  |  |  |  |  |  |
| R15 |  |  |  |  | 100 |  |  |  |  | 50 |
| R19 |  |  |  |  |  | 50 |  |  |  |  |
| R9 |  |  |  |  |  | 50 |  |  |  |  |
| R3 |  |  |  |  |  |  | 50 |  | 50 |  |
| R21 |  |  |  |  |  |  | 50 |  |  | 50 |
| R8 |  |  |  |  |  |  |  | 50 |  |  |
| R25 |  |  |  |  |  |  |  | 50 |  |  |
| R39 |  |  |  |  |  |  |  |  | 50 |  |
| Celloxide 2021 | 30 |  |  |  |  |  |  |  |  |  |
| Celloxide 2081 |  | 30 |  |  |  |  |  |  |  |  |
| TSL 8350 |  |  | 10 |  |  |  |  | 10 |  |  |
| H-1 |  |  |  | 10 |  |  |  |  |  |  |
| H-2 |  |  |  |  | 10 |  |  |  | 20 |  |
| H-3 |  |  |  |  |  | 10 |  |  |  |  |
| San-aid SIL 110 | 2 | 2 | 2 |  |  |  | 2 |  | 2 |  |
| Monooctyl phosphate |  |  |  |  |  | 1 |  | 1 |  | 1 |
| Trisacetylacetonate aluminium |  |  |  | 2 | 2 | 2 |  | 2 |  | 2 |
| Acetone | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 |

TABLE 23

|  | C154 | C155 | C156 | C157 | C158 | C159 | C160 | C161 | C162 | C163 |
|---|---|---|---|---|---|---|---|---|---|---|
| R1 | 100 |  |  |  |  |  |  |  |  |  |
| R7 |  | 100 |  |  |  |  |  |  |  |  |
| R10 |  |  | 100 |  |  |  |  |  |  |  |
| R12 |  |  |  | 100 |  |  |  |  |  |  |
| R15 |  |  |  |  | 100 |  |  |  |  | 50 |
| R19 |  |  |  |  |  | 50 |  |  |  |  |
| R9 |  |  |  |  |  | 50 |  |  |  |  |
| R3 |  |  |  |  |  |  | 50 |  | 50 |  |
| R21 |  |  |  |  |  |  | 50 |  |  | 50 |
| R8 |  |  |  |  |  |  |  | 50 |  |  |
| R25 |  |  |  |  |  |  |  | 50 |  |  |
| R39 |  |  |  |  |  |  |  |  | 50 |  |
| Celloxide 2021 | 30 |  |  |  | 20 |  | 50 |  |  | 20 |
| Celloxide 2081 |  | 30 |  |  |  |  |  |  |  |  |
| TSL 8350 |  |  |  |  |  |  |  | 10 |  |  |
| H-1 | 20 |  |  | 10 |  |  |  |  |  |  |
| H-2 |  | 20 |  |  | 10 |  |  |  | 20 |  |
| H-3 |  |  | 20 | 10 |  | 10 |  |  |  |  |
| Burnock 901S | 10 | 15 | 5 | 15 | 10 | 10 | 10 | 10 | 10 | 10 |
| San-aid SIL 110 | 2 | 2 | 2 |  |  |  | 2 |  | 2 |  |
| Monooctyl phosphate | 1 | 1 | 1 | 1 | 1 | 1 | 1 | 1 | 1 | 1 |
| Trisacetylacetonate aluminium |  |  |  | 2 | 2 | 2 |  | 2 |  | 2 |
| Acetone | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 |

In case where polyester oligomers are used

TABLE 24

| | C164 | C165 | C166 | C167 | C168 | C169 | C170 | C171 | C172 | C173 |
|---|---|---|---|---|---|---|---|---|---|---|
| P1 | 100 | | | | | | | | | |
| P2 | | 100 | | | | | | | | |
| P3 | | | 100 | | | | | | 100 | |
| P4 | | | | 100 | | | | | | |
| P5 | | | | | 100 | | | | | |
| P6 | | | | | | 100 | | | | 100 |
| P7 | | | | | | | 100 | | | |
| P8 | | | | | | | | 100 | | |
| Celloxide 2021 | | | | | | | | | 20 | |
| Celloxide 2081 | | 20 | | | | | | | | |
| TSL 8350 | | | | | | | | | | 20 |
| H-1 | | | | 20 | | | | | | |
| H-3 | | | | | | | | 20 | | |
| San-aid SIL 110 | 2 | 2 | 2 | | 2 | 2 | 2 | | 2 | |
| Phenyl trimethoxy silane | | | | 4 | | | | 4 | | |
| Burnock 901S | | | | | 10 | | | | | |
| Monooctyl phosphate | | | | | 1 | | | 1 | 1 | 1 |
| Trisacetylacetonate aluminium | | | | 2 | | | | 2 | | 2 |
| Acetone | 2 | 2 | 2 | 2 | 2 | 2 | 2 | 2 | 2 | 2 |
| KP 321 | 0.5 | 0.5 | 0.5 | 0.5 | 0.5 | 0.5 | 0.5 | 0.5 | 0.5 | 0.5 |
| Sanduvor 3206 | 1 | 1 | 1 | 1 | 1 | 1 | 1 | 1 | 1 | 1 |
| Sanduvor 3058 | 0.5 | 0.5 | 0.5 | 0.5 | 0.5 | 0.5 | 0.5 | 0.5 | 0.5 | 0.5 |

[2] Preparation of intercoating composition

The synthesized acrylic oligomers or polyester oligomers were mixed with pigments in two formulations [(a) and (b)] and the pigments were dispersed for one hour with Motor mill (manufactured by Igar Japan), to produce pigment dispersed compositions.

(a) R1, R3, R9-10, R12, R15, R19, R21 and R39 P1-3 and P6

| | Part |
|---|---|
| Oligomers (acrylic or polyester oligomers) | 75 |
| CR 90 Titanium oxide (manufactured by Ishihara Sangyo Kaisha Ltd.) | 25 |

(b) R7-8 and R25 P4-5 and P7-8

| | Part |
|---|---|
| Oligomers (acrylic or polyester oligomers) | 60 |
| CR 90 Titanium oxide (manufactured by Ishihara Sangyo Kaisha Ltd.) | 20 |
| Methylisobutyl ketone | 20 |

(1) Preparation of intercoating compositions using acrylic oligomers

TABLE 25

| | S1 | S2 | S3 | S4 | S5 | S6 | S7 | S8 | S9 | S10 |
|---|---|---|---|---|---|---|---|---|---|---|
| WR1 | 100 | | | | | | | | | |
| WR7 | | 100 | | | | | | | | |
| WR10 | | | 100 | | | | | | | |
| WR12 | | | | 100 | | | | | | |
| WR15 | | | | | 100 | | | | | 50 |
| WR19 | | | | | | 50 | | | | |
| WR9 | | | | | | 50 | | | | |
| WR3 | | | | | | | 50 | | 50 | |
| WR21 | | | | | | | 50 | | | 50 |
| WR8 | | | | | | | | 50 | | |
| WR25 | | | | | | | | 50 | | |
| WR39 | | | | | | | | | 50 | |
| Celloxide 2021 | 30 | | | | | | | 50 | | 20 |
| H-2 | | | | | 20 | | | | | |
| Burnock 901S | | | | | 10 | | | | | |
| San-aid SIL 110 | 2 | 2 | 2 | | | | 2 | 2 | 2 | |
| Monooctyl phosphate | | | | 1 | 1 | | | 1 | | 1 |
| Trisacetylacetonate aluminium | | | | 2 | 2 | 2 | | | 2 | |
| Acetone | 2 | 2 | 2 | 2 | 2 | 2 | 2 | 2 | 2 | 2 |
| Byketol OK | 1 | 1 | 1 | 1 | 1 | 1 | 1 | 1 | 1 | 1 |

(2) Preparation of intercoating compositions using polyester oligomers

TABLE 26

| | S11 | S12 | S13 | S14 | S15 | S16 | S17 | S18 | S19 |
|---|---|---|---|---|---|---|---|---|---|
| WP1 | 100 | | | | | | | | |
| WP2 | | 100 | | | | | | | |
| WP3 | | | 100 | | | | | | 100 |
| WP4 | | | | 100 | | | | | |
| WP5 | | | | | 100 | | | | |
| WP6 | | | | | | 100 | | | |
| WP7 | | | | | | | 100 | | |
| WP8 | | | | | | | | 100 | |
| Celloxide 2021 | | | | | | | | | 20 |
| Celloxide 2081 | | 20 | | | | | | | |
| H-1 | | | | 20 | | | | | |
| H-3 | | | | | | | | 20 | |
| San-aid SIL 110 | 2 | 2 | 2 | | 2 | 2 | 2 | | 2 |
| Phenyl trimethoxy silane | | | | 4 | | | | 4 | |
| Burnock 901S | | | | | 10 | | | | |
| Monooctyl phosphate | | | | | 1 | | | 1 | 1 |
| Trisacetylacetonate aluminium | | | | 2 | | | | 2 | |
| Acetone | 2 | 2 | 2 | 2 | 2 | 2 | 2 | 2 | 2 |
| Byketol OK | 1 | 1 | 1 | 1 | 1 | 1 | 1 | 1 | 1 |

[3] Preparation of solid color coating compositions

The synthesized oligomers were mixed with pigments in two formulations [(a) and (b)] and the pigments were dispersed therein for one hour with Motor mill (manufactured by Igar Japan), to produce pigment dispersed compositions.

(a)R1, R3, R9-10, R12, R15, R19, R21 and R39 P1-3 and P6

| | Part |
|---|---|
| Oligomers (acrylic or polyester oligomers) | 75 |
| CR 90 Titanium oxide (manufactured by Ishihara Sangyo Kaisha Ltd.) | 25 |

(b)R7-8 and R25 P4-5 and P7-8

| | Part |
|---|---|
| Oligomers (acrylic or polyester oligomers) | 60 |
| CR 90 Titanium oxide (manufactured by Ishihara Sangyo Kaisha Ltd.) | 20 |
| Methylisobutyl ketone | 20 |

(1) Preparation of solid color coating compositions using acrylic oligomers

TABLE 27

| | T1 | T2 | T3 | T4 | T5 | T6 | T7 | T8 | T9 | T10 |
|---|---|---|---|---|---|---|---|---|---|---|
| WP 1 | 100 | | | | | | | | | |
| WP 7 | | 100 | | | | | | | | |
| WP 10 | | | 100 | | | | | | | |
| WP 12 | | | | 100 | | | | | | |
| WP 15 | | | | | 100 | | | | | 50 |
| WP 19 | | | | | | 50 | | | | |
| WP 9 | | | | | | 50 | | | | |
| WP 3 | | | | | | | 50 | | 50 | |
| WP 21 | | | | | | | 50 | | | 50 |
| WP 8 | | | | | | | | 50 | | |
| WP 25 | | | | | | | | 50 | | |
| WP 39 | | | | | | | | | 50 | |
| Celloxide 2021 | 30 | | | | | | 50 | | | 20 |
| H - 2 | | | | | 20 | | | | | |
| Burnock 901S | | | | | 10 | | | | | |
| San-aid SIL 110 | 2 | 2 | 2 | | | | 2 | 2 | 2 | |
| Monooctyl phosphate | | | | 1 | 1 | | 1 | | | 1 |
| Trisacetylacetonate aluminium | | | | 2 | 2 | 2 | | | | 2 |
| Acetone | 2 | 2 | 2 | 2 | 2 | 2 | 2 | 2 | 2 | 2 |
| KP 321 | 0.2 | 0.2 | 0.2 | 0.2 | 0.2 | 0.2 | 0.2 | 0.2 | 0.2 | 0.2 |
| Sanduvor 3206 | 2 | 2 | 2 | 2 | 2 | 2 | 2 | 2 | 2 | 2 |
| Sanduvor 3058 | 1 | 1 | 1 | 1 | 1 | 1 | 1 | 1 | 1 | 1 |

(2) Preparation of solid color coating compositions using polyester compositions

TABLE 28

|  | T11 | T12 | T13 | T14 | T15 | T16 | T17 | T18 | T19 |
|---|---|---|---|---|---|---|---|---|---|
| WP 1 | 100 | | | | | | | | |
| WP 2 | | 100 | | | | | | | |
| WP 3 | | | 100 | | | | | | 100 |
| WP 4 | | | | 100 | | | | | |
| WP 5 | | | | | 100 | | | | |
| WP 6 | | | | | | 100 | | | |
| WP 7 | | | | | | | 100 | | |
| WP 8 | | | | | | | | 100 | |
| Celloxide 2021 | | | | | | | | | 20 |
| Celloxide 2081 | | 20 | | | | | | | |
| H - 1 | | | | 20 | | | | | |
| H - 3 | | | | | | | | 20 | |
| San-aid SIL 110 | 2 | 2 | 2 | | 2 | 2 | 2 | | 2 |
| Phenyl trimethoxy silane | | | | 4 | | | | 4 | |
| Burnock 901S | | | | | 10 | | | | |
| Monooctyl phosphate | | | | | 1 | | | 1 | 1 |
| Trisacetylacetonate aluminium | | | | 2 | | | | 2 | |
| Acetone | 2 | 2 | 2 | 2 | 2 | 2 | 2 | 2 | 2 |
| KP 321 | 0.2 | 0.2 | 0.2 | 0.2 | 0.2 | 0.2 | 0.2 | 0.2 | 0.2 |
| Sanduvor 3206 | 2 | 2 | 2 | 2 | 2 | 2 | 2 | 2 | 2 |
| Sanduvor 3508 | 1 | 1 | 1 | 1 | 1 | 1 | 1 | 1 | 1 |

[4] Preparation of base coating compositions
(1) Synthesis of Amide wax

Into a flask with a stirrer and a drpping funnel, 1495 parts of Celloxide 2021 was introduced and cooled to 10° C., where 39.4 parts of aniline was introduced and stirred. Then, 35.6 parts of hexamethylene diisocyanate was dropped to the flask over 30 min. with a dropping funnel. After the addition of the diisocyanate, the stirring was further continued at 10° C. for 30 min., produce Amide wax.

(2) Preparation of base coating compositions

The base coating compositions were prepared using acrylic or polyester oligomers based on the formulations shown in Table 29 below.

compositions to be used together with clear coating compositions.

TABLE 30

|  | BB1 | BB2 | BB3 | BB4 |
|---|---|---|---|---|
| 606C | 10 | 10 | 10 | 10 |
| Methylethyl ketone | 10 | 10 | 10 | 10 |
| O-1 | 60 | | 60 | |
| O-2 | | 60 | | 60 |
| MG 100 S | 5 | 5 | 5 | 5 |
| Cymel 370 | 20 | 20 | | |
| Cymel 325 | | | 20 | 20 |

TABLE 29

|  | B1 | B2 | B3 | B4 | B5 | B6 | B7 | B8 | B9 | B10 |
|---|---|---|---|---|---|---|---|---|---|---|
| 606C | 10 | 10 | 10 | 10 | 10 | 10 | 10 | 10 | 10 | 10 |
| Methyl ethyl ketone | 10 | 10 | 10 | 10 | 10 | 10 | 10 | 10 | 10 | 10 |
| R 1 | 70 | | | | | | | | | |
| R 5 | | 70 | | | | | | | | |
| R 28 | | | 70 | 50 | 40 | 50 | | | | |
| R 17 | | | | 20 | | | | | | |
| R 14 | | | | | 30 | | | | | |
| R 34 | | | | | | 20 | | | | |
| P 2 | | | | | | | 70 | | | |
| P 6 | | | | | | | | 70 | | |
| P 7 | | | | | | | | | 70 | |
| P 8 | | | | | | | | | | 70 |
| Amide wax | 10 | 10 | 10 | 10 | 10 | | 10 | 10 | | |
| MG 100S | | | | | | 8 | | | 8 | 8 |
| Celloxide 2021 | | | | | | | | | 10 | 10 |
| San-aid SIL L10 | 2 | | 2 | | | 2 | 2 | 2 | 2 | |
| Diphenyl dimethoxy silane | | 4 | | | | | | | | 4 |
| Monooctyl phosphate | | | | | | 1 | | | | |
| Trisacetylacetonate aluminium | | 2 | | 2 | 2 | 2 | | | | 2 |
| Acetone | 2 | 2 | 2 | 2 | 2 | 2 | 2 | 2 | 2 | 2 |
| KP 321 | 0.01 | 0.01 | 0.01 | 0.01 | 0.01 | 0.01 | 0.01 | 0.01 | 0.01 | 0.01 |
| Sanduvor 3206 | 1 | 1 | 1 | 1 | 1 | 1 | 1 | 1 | 1 | 1 |
| Sanduvor 3508 | 0.5 | 0.5 | 0.5 | 0.5 | 0.5 | 0.5 | 0.5 | 0.5 | 0.5 | 0.5 |

(3) For convenience sake, the coating compositions having the following formulations were prepared as base coating

TABLE 30-continued

|  | BB1 | BB2 | BB3 | BB4 |
|---|---|---|---|---|
| Monooctyl phosphate | 2 | 2 | 2 | 2 |
| KP 321 | 0.02 | 0.02 | 0.02 | 0.02 |
| Sanduvor 3206 | 1 | 1 | 1 | 1 |
| Sanduvor 3258 | 0.5 | 0.5 | 0.5 | 0.5 |

In the above table, 0-1 and 0-2 are oligomers having a weight average molecular weight of 6000 or lower and prepared based on the formulations shown in Table 31 below in the same manner as the above.

In this case, the resultant materials were subjected to the reduced pressure to remove the solvents, to produce 80% solutions.

TABLE 31

|  | O-1 | O-2 |
|---|---|---|
| Xylene | 200 | 100 |
| BA | 20 | 20 |
| BMA | 50 | 40 |
| ST | 10 | 10 |
| HEMA | 20 |  |
| Placcel FM1 |  | 30 |
| P-O | 6 | 6 |
| Xylene | 1 | 1 |
| P-O | 0.1 | 0.1 |
| Xylene | 1 | 1 |
| Mw | 2850 | 5320 |

In the table above, Placcel FM1 is caprolactone modified hydroxyl group-containing monomer manufactured by Daisel Ltd.

Comparative Examples (1) Synthesis of acrylic oligomers

The following oligomers were prepared in the same manner as the examples. In this case, Q1 and Q2 were prepared under the conditions that the monomer mixture and the polymerization initiator were dropped over 2 hr. with the same speed and Q3 was prepared under the conditions that the monomer mixture and 5% of the polymerization initiator were dropped over 2 hr. together with the refluxing solvent, followed by the reaction for one hr. and then followed by the addition of the remaining initiator over 2 hr. with the same speed.

TABLE 32

|  |  | Q1 | Q2 | Q3 |
|---|---|---|---|---|
| Mn |  | 1800 | 2156 | 1800 |
| Mw |  | 4320 | 3980 | 4860 |
| Mw/Mn |  | 2.4 | 1.8 | 2.7 |
| Tg |  | 0 | 14 | 14 |
| Alicyclic epoxy group(mol/kg resin) |  | 4 | 2 | 4 |
| Reflux solvent | Xylene | 374 | 842 | 374 |
| Monomer mixture | A200 | 235.6 |  | 235.6 |
|  | M100 |  | 121.8 |  |
|  | BA | 63.55 | 104.7 | 63.55 |
|  | MMA |  | 73.5 |  |
|  | EHMA | 10.85 | 62 | 10.85 |
| Polymerization catalyst | P-O | 19 | 14 | 19 |
|  | Butyl acetate | 30 | 29 | 30 |
| Additional catalyst | P-O | 1.55 | 1.5 | 1.55 |
|  | Butyl acetate | 1 | 1 | 1 |

(2) Synthesis of polyester oligomers

TABLE 33

|  |  | Q4 | Q5 |
|---|---|---|---|
| Mn |  | 2000 | 1900 |
| Mw |  | 3800 | 5700 |
| Mw/Mn |  | 1.9 | 3.0 |
| Alicyclic epoxy group (mol/kg resin) |  | 4.4 | 4.7 |
| 1 | Methyl ethyl ketone | 300 | 300 |
|  | Pyromellitic anhydride | 218 | 436 |
|  | Monomer E | 540 | 270 |
| 2 | ε-caprolactone | 600 | 600 |
|  | Glyciale PP 300 | 456 | 456 |
|  | Ethylene glycol |  | 32 |
|  | Dimethylimidazole | 1 | 1 |
|  | Teterabutyl titanate | 1 | 1 |

Q 4 was prepared by conducting the reaction of the compounds of 1 for 2 hr. at a reflux temperature of methyl ethyl ketone, then adding to the reaction mixture, ε-captolactone and tetrabutyl titanate, to conduct the reaction, and then Glyciale PP 300 (manufactured by Sanyo Chemical Industries, Ltd.) and dimethylimidazole, to conduct the reaction for 3 hr.

Q 5 was prepared by introducing the compounds of 1 and 2 to conduct the reaction for 5 hr. at a reflux temperature of methyl ethyl ketone.

Preparation of the comparative coating compositions

The comparative clear coating compositions, solid color coating compositions, intercoating compositions and base coating compositions were prepared in the same manner as the examples.

(1) Preparation of clear coating compositions

TABLE 34

|  | QC1 | QC2 | QC3 | QC4 | QC5 |
|---|---|---|---|---|---|
| Q1 | 100 |  |  |  |  |
| Q2 |  | 100 |  |  |  |
| Q3 |  |  | 100 |  |  |
| Q4 |  |  |  | 100 |  |
| Q5 |  |  |  |  | 100 |
| San-aid SIL 110 | 2 | 2 |  | 2 | 2 |
| Diphenyl dimethoxy silane |  |  | 4 |  |  |
| Trisacetylacetonate aluminium |  |  | 2 |  |  |
| Acetone | 2 | 2 | 2 | 2 | 2 |
| Saduvor 3206 | 1 | 1 | 1 | 1 | 1 |
| Sanduvor 3058 | 0.5 | 0.5 | 0.5 | 0.5 | 0.5 |
| KP 321 | 0.5 | 0.5 | 0.5 | 0.5 | 0.5 |

(2) Preparation of intercoating compositions

The pigment dispersed compositons WQ1 to 5 were prepared in the same manner as the examples, except that the following formulations were used.

|  | Part |
|---|---|
| Comparative oligomers Q1 to 5 | 50 |
| CR 90 | 25 |
| Methyl isobutyl ketone | 25 |

Then, the resultant pigment dispersed compositions were used to form intercoating compositions based on the following formulations.

TABLE 35

|   | QS1 | QS2 | QS3 | QS4 | QS5 |
|---|---|---|---|---|---|
| WQ1 | 100 | | | | |
| WQ2 | | 100 | | | |
| WQ3 | | | 100 | | |
| WQ4 | | | | 100 | |
| WQ5 | | | | | 100 |
| San-aid SIL 110 | 2 | 2 | | 2 | 2 |
| Diphenyl dimethoxy silane | | | 4 | | |
| Trisacetylacetonate aluminium | | | | 2 | |
| Acetone | 2 | 2 | 2 | 2 | 2 |
| Byketol-OK | 1 | 1 | 1 | 1 | 1 |

(3) Preparation of solid color coating compositions

The above pigment dispersed compositions were used based on the following formulations, to prepare solid color coating compositions.

TABLE 36

|   | QS1 | QS2 | QS3 | QS4 | QS5 |
|---|---|---|---|---|---|
| WQ1 | 100 | | | | |
| WQ2 | | 100 | | | |
| WQ3 | | | 100 | | |
| WQ4 | | | | 100 | |
| WQ5 | | | | | 100 |
| San-aid SIL 110 | 2 | 2 | | 2 | 2 |
| Diphenyl dimethoxy silane | | | 4 | | |
| Trisacetylacetonate aluminium | | | | 2 | |
| Acetone | 2 | 2 | 2 | 2 | 2 |
| Sanduvor 3206 | 2 | 2 | 2 | 2 | 2 |
| Sanduvor 3058 | 1 | 1 | 1 | 1 | 1 |
| KP 321 | 0.2 | 0.2 | 0.2 | 0.2 | 0.2 |

(4) Preparation of base coating compositions

The above pigment dispersed compositions were used based on the following formulations shown in Table 37 below, to produce the base coating compositions.

TABLE 37

|   | QB1 | QB2 | QB3 | QB4 | QB5 |
|---|---|---|---|---|---|
| 606 | 10 | 10 | 10 | 10 | 10 |
| Toluene | 10 | 10 | 10 | 10 | 10 |
| Q1 | 70 | | | | |
| Q2 | | 70 | | | |
| Q3 | | | 70 | | |
| Q4 | | | | 70 | |
| Q5 | | | | | 70 |
| Amide wax | 10 | 10 | 10 | 10 | 10 |
| San-aid SIL 110 | 2 | 2 | | 2 | 2 |
| Diphenyl dimethoxy silane | | | 4 | | |
| Trisacetylacetonate aluminium | | | | 2 | |
| Acetone | 2 | 2 | 2 | 2 | 2 |
| Sanduvor 3206 | 1 | 1 | 1 | 1 | 1 |
| Sanduvor 3058 | 0.5 | 0.5 | 0.5 | 0.5 | 0.5 |
| KP 321 | 0.02 | 0.02 | 0.02 | 0.02 | 0.02 |

(5) Preparation of comparative base coating composition

Oligomers Q1 and Q2 were used based on the following formulations shown in Table 38 below, to produce comparative base coating compositions.

Preparation of base coating compositions comprising oligomers and melamine:

TABLE 38

|   | QBB 1 | QBB 2 |
|---|---|---|
| 606C | 10 | 10 |
| Methyl ethyl ketone | 10 | 10 |
| O - 1 | 60 | |
| O - 2 | | 60 |
| Cymel 303 | 20 | 20 |
| p-toluene sufonic acid | 2 | 2 |
| MG 100S | 5 | 5 |
| Saduvor 3206 | 1 | 1 |
| Sanduvor 3058 | 0.5 | 0.5 |
| KP 321 | 0.02 | 0.02 |

Evaluation of coating properties

[1] Preparation of test pieces

The amounts of the solvents of the resultant clear coating, intercoating and base coating compositions so that they can be coated at 25° C. and 60° C. (100 cps) were determined and the solvent contents (%) were calculated. In this case, a mixed solvent of xylene/cyclohexane (weight ratio of 50/50) was used for the clear coating, intercoating and solid color coating compositions, and a mixed solvent of toluene/methyl isobutyl ketone (weight ratio of 50/50) was used for the base coating compositions.

[2] (1) Coating of clear coating compositions

The comparative high solid base coating compositions BB1 to 4 using oligomers having a weight average molecular weight of 6000 or less were coated on the substrate which had been coated with the intercoating layer (OTO 825 manufactured by Nippon Paint Co., Ltd.), with a wider 77 as a coating gun. In case of solvent-type base coating compositions, the base coating was set for 10 min. and then the prepared clear coating compositions were coated thereon. In case of aqueous-type base coating compositions, the base coating was dried at 100° C. for 10 min. and then the prepared clear coating compositions were coated thereon. In both cases, the clear coatings were baked at 140° C. for 30 min.

(2) Coating of intercoating compositions

The prepared intercoating compositions were coated on the electrodeposited substrate using a wider 77 as a coating gun and then baked at 150° C. for 30 min. Then, either of a solvent-type base coating composition (OTOH500 manufactured by Nippon Paint Co., Ltd.) or an aqueous-type base coating composition (OTOH900 manufactured by Nippon Paint Co., Ltd.) was coated thereon. Thereafter, OTO561 clear coating composition (manufactured by Nippon Paint Co., Ltd.) was coated on the solvent-type base coating after the base coating was set for 10 min., or OTO580 clear coating composition (manufactured by Nippon Paint Co., Ltd.) was coated on the aqueous-type base coating after the base coating was dried at 100° C. for 10 min. Thereafter, the resultant substrate was baked at 140° C. for 30 min.

(3) Coating of solid color coating compositions

The prepared solid color coating compositions were coated on a substrate which had been coated with the intercoating layer (OTO 825 manufactured by Nippon Paint Co., Ltd.), using a wider 77 as a coating gun and then baked at 150° C. for 30 min.

(4) Coating of base coating compositions

The prepared base coating compositions B1 to 10 were coated on a substrate which had been coated with the intercoating layer (OTO 825 manufactured by Nippon Paint Co., Ltd.), using a wider 77 as a coating gun. After the base coating was set for 10 min., OTO561 clear coating composition (manufactured by Nippon Paint Co., Ltd.) was coated thereon and then baked at 140° C. for 30 min.

In this case, the clear coating compositions were used together with the base coating compositions in the following combinations.

For C167 to 172; BB1 was used.
For C173 to 174, BB2 was used.
For C1 to C166, BB3 was used.
For QC1 to QC2, BB4 was used.
For QC3, QBB1 was used.
For QC4 to QC5, QBB2 was used.

The results of the resultant coatings as determined by the tests explained below were listed in the tables below. In the tables, the case where a solvent-type base coating composition was coated on the intercoating is indicated by "Solvent base", while the case where an aqueous base coating composition was coated on the intercoating is indicated by "Aqueous base".

[3] Method for evaluating the properties
(1) Water resistance test

The test piece was immersed in hot water at 60° C. for 10 days and then the piece was subjected to cross cut tape peeling test (adhesion test). In the table, ⊚ means no peeling of the coating; ○ means that the peeled area is less than 5% of the total area; X means that the peeled area is 5% or more of the total area.

(2) Adhesion test

Cross-cut is made on the test piece with a nife. Adhesive tape is attached thereto and then peeled. In the table, ○ means the indication of adhesion; and X means no indication of adhesion.

(3) Thermal cycle test

Cross-cut is made on the test piece with a nife and then the piece is subjected to 10 cycles, each of which comprises maintaining the piece at 30° C., for one hour; at normal temperature for one hour; at –20° C. for one hour; and at normal temperature for one hour. The evaluation is made by observing the generation of crack. ○ means no crack; and X means generation of crack.

(4) Solvent content

The limit viscosity of the coating composition so that the composition can be hot sprayed at 25° C. and 60° C. is measured in respect of %. In the tables, ⊚ means that the coating is possible at a solvent content of 15% or less; ○ means that the coating is possible at a solvent content of more than 15% and 30% or less; Δ means that the coating is possible at a solvent content of more than 30% and 40% or less; and X means that the coating is possible at a solvent content of more than 40%.

(5) Chipping resistance test

The test piece is set at an angle of 20° in diamond shot tester. Then, diamond having a weight of 0.02 g is caused to collide with the piece at –20° C. at a speed of 200 km/H. The evaluation is made by observing the peeled area (in respect of a unit of $mm^2$) by the collision. In the tables, ⊚ means that the peeled area is smaller than 1; ○ means that the peeled area is 1 or larger and smaller than 2; Δ means that the peeled area is 2 or larger and smaller than 3; and X means that the peeled area is 3 or larger.

(6) Alkali resistance test 0.2 ml of a 5% NaOH aqueous solution is dropped on the test piece, which is then dried at 80° C. for 30 min. The evaluation is made by observing the change of the coating condition. ○ means no change; and X means generation of stain.

(7) Weathering resistance test

The test piece is subjected to accelerated weathering tester for 3000 hr. The evaluation is made by determining the gloss maintaining proportions of the coatings. In the tables, ⊚ means that the gloss maintaining proportion is 85% or higher; ○ means that the gloss maintaining proportion is 70% or higher and less than 85%; and X means that the gloss maintaining proportion is less than 70%.

(8) Scuff resistance test

A felt is caused to absorb a cleanser in an amount of 5%. The test piece is rubbed so that the felt is subjected to 30 times of reciprocating movements on the piece, with a weight of 1 kg imposed on the felt. The evaluation is made by determining the gloss maintaining proportions of the coatings. In the tables, ⊚ means that the gloss maintaining proportion is 75% or higher; ○ means that the gloss maintaining proportion is 60% or higher and less than 75%; and X means that the gloss maintaining proportion is less than 60%.

(9) Gasoline resistance test

The test piece is declined at 45°. 1 ml of gasoline (Nisseki silver) is caused to flow thereon and left to stand. This procedure is repeated 10 times. The evaluation is made by observing the change of the coating condition. In the tables, ○ means no change; Δ means that the coating is swelled; and X means the color change or the generation of crack.

TABLE 39

(Example)
(1) Clear Coating

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C1 | ○ | ○ | ⊚ | ⊚ | ⊚ | ⊚ | ○ | ⊚ | ○ | ○ |
| C2 | ○ | ○ | ⊚ | ⊚ | ⊚ | ⊚ | Δ | ○ | ○ | ○ |
| C3 | ○ | ○ | ⊚ | ⊚ | ⊚ | ⊚ | ○ | ⊚ | ○ | ○ |
| C4 | ○ | ○ | ○ | ○ | ⊚ | ⊚ | ○ | ⊚ | Δ | Δ |
| C5 | ○ | ○ | ○ | ○ | ⊚ | ⊚ | ○ | ⊚ | ○ | ○ |
| C6 | ○ | ○ | ⊚ | ⊚ | ⊚ | ⊚ | Δ | ○ | ○ | ○ |
| C7 | ○ | ○ | ⊚ | ⊚ | ⊚ | ⊚ | Δ | Δ | ○ | ○ |
| C8 | ○ | ○ | ⊚ | ⊚ | ○ | ○ | ⊚ | ⊚ | Δ | Δ |
| C9 | ○ | ○ | ○ | ○ | ⊚ | ⊚ | ○ | ⊚ | Δ | Δ |
| C10 | ○ | ○ | ⊚ | ⊚ | ⊚ | ⊚ | Δ | ○ | ○ | ○ |
| C11 | ○ | ○ | ⊚ | ⊚ | ⊚ | ⊚ | ○ | ⊚ | ○ | ○ |
| C12 | ○ | ○ | ⊚ | ⊚ | ⊚ | ⊚ | ○ | ⊚ | ○ | ○ |
| C13 | ○ | ○ | ⊚ | ⊚ | ⊚ | ⊚ | Δ | ○ | ○ | ○ |

TABLE 39-continued (Example)
(1) Clear Coating

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C14 | ○ | ○ | ◎ | ◎ | ◎ | ◎ | Δ | ○ | ○ | ○ |
| C15 | ○ | ○ | ◎ | ◎ | ○ | ○ | ◎ | ◎ | Δ | Δ |
| C16 | ○ | ○ | ◎ | ◎ | ◎ | ◎ | ○ | ◎ | ○ | ○ |
| C17 | ○ | ○ | ◎ | ◎ | ◎ | ◎ | Δ | ○ | ○ | ○ |
| C18 | ○ | ○ | ○ | ○ | ○ | ○ | ◎ | ◎ | Δ | Δ |
| C19 | ○ | ○ | ◎ | ◎ | ◎ | ◎ | Δ | Δ | Δ | Δ |
| C20 | ○ | ○ | ○ | ○ | ◎ | ◎ | ◎ | ◎ | Δ | Δ |
| C21 | ○ | ○ | ○ | ○ | ◎ | ◎ | Δ | ○ | ○ | ○ |
| C22 | ○ | ○ | ○ | ○ | ◎ | ◎ | Δ | Δ | ○ | ○ |
| C23 | ○ | ○ | ◎ | ◎ | ◎ | ◎ | ○ | ◎ | ○ | ○ |
| C24 | ○ | ○ | ○ | ○ | ◎ | ◎ | ○ | ◎ | Δ | Δ |
| C25 | ○ | ○ | ◎ | ◎ | ◎ | ◎ | ○ | ◎ | ○ | ○ |
| C26 | ○ | ○ | ◎ | ◎ | ◎ | ◎ | Δ | ○ | ○ | ○ |

TABLE 40

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C27 | ○ | ○ | ◎ | ◎ | ◎ | ◎ | Δ | ○ | ○ | ○ |
| C28 | ○ | ○ | ◎ | ◎ | ◎ | ◎ | ○ | ◎ | ○ | ○ |
| C29 | ○ | ○ | ◎ | ◎ | ◎ | ◎ | ○ | ◎ | ○ | ○ |
| C30 | ○ | ○ | ◎ | ◎ | ◎ | ◎ | ○ | ◎ | ○ | ○ |
| C31 | ○ | ○ | ◎ | ◎ | ◎ | ◎ | ○ | ◎ | ○ | ○ |
| C32 | ○ | ○ | ○ | ○ | ○ | ○ | Δ | ○ | ○ | ○ |
| C33 | ○ | ○ | ○ | ○ | ○ | ○ | ◎ | ◎ | Δ | Δ |
| C34 | ○ | ○ | ○ | ○ | ◎ | ◎ | ○ | ◎ | ○ | ○ |
| C35 | ○ | ○ | ○ | ○ | ◎ | ◎ | ○ | ◎ | ○ | ○ |
| C36 | ○ | ○ | ○ | ○ | ◎ | ◎ | Δ | ○ | ○ | ○ |
| C37 | ○ | ○ | ○ | ○ | ◎ | ◎ | ○ | ◎ | ○ | ○ |
| C38 | ○ | ○ | ○ | ○ | ◎ | ◎ | ○ | ◎ | ○ | ○ |
| C39 | ○ | ○ | ○ | ○ | ◎ | ◎ | ○ | ◎ | ○ | ○ |
| C40 | ○ | ○ | ○ | ○ | ◎ | ◎ | ○ | ◎ | ○ | ○ |
| C41 | ○ | ○ | ○ | ○ | ◎ | ◎ | ○ | ◎ | ○ | ○ |
| C42 | ○ | ○ | ◎ | ◎ | ◎ | ◎ | Δ | ○ | ○ | ○ |
| C43 | ○ | ○ | ◎ | ◎ | ◎ | ◎ | Δ | ○ | ○ | ○ |
| C44 | ○ | ○ | ○ | ○ | ○ | ○ | ○ | ◎ | Δ | Δ |
| C45 | ○ | ○ | ◎ | ◎ | ○ | ○ | ○ | ◎ | Δ | Δ |
| C46 | ○ | ○ | ◎ | ◎ | ◎ | ◎ | ○ | ◎ | ○ | ○ |
| C47 | ○ | ○ | ◎ | ◎ | ◎ | ◎ | Δ | ○ | ○ | ○ |
| C48 | ○ | ○ | ◎ | ◎ | ◎ | ◎ | Δ | ○ | ○ | ○ |
| C49 | ○ | ○ | ◎ | ◎ | ◎ | ◎ | ○ | ◎ | ○ | ○ |
| C50 | ○ | ○ | ◎ | ◎ | ◎ | ◎ | ○ | ◎ | ○ | ○ |
| C51 | ○ | ○ | ◎ | ◎ | ◎ | ◎ | Δ | ○ | ○ | ○ |
| C52 | ○ | ○ | ◎ | ◎ | ◎ | ◎ | ○ | ◎ | ○ | ○ |

TABLE 41

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C53 | ○ | ○ | ◎ | ◎ | ◎ | ◎ | ○ | ◎ | ○ | ○ |
| C54 | ○ | ○ | ◎ | ◎ | ◎ | ◎ | Δ | Δ | ○ | ○ |
| C55 | ○ | ○ | ◎ | ◎ | ◎ | ◎ | ○ | ◎ | ○ | ○ |
| C56 | ○ | ○ | ◎ | ◎ | ◎ | ◎ | ○ | ◎ | ○ | ○ |

TABLE 41-continued (Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C57 | ○ | ○ | ◎ | ◎ | ◎ | ◎ | △ | ○ | ○ | ○ |
| C58 | ○ | ○ | ○ | ○ | ◎ | ◎ | ○ | ◎ | ○ | ○ |
| C59 | ○ | ○ | ○ | ○ | ◎ | ◎ | ○ | ◎ | ○ | ○ |
| C60 | ○ | ○ | ○ | ○ | ◎ | ◎ | △ | ○ | ○ | ○ |
| C61 | ○ | ○ | ○ | ○ | ◎ | ◎ | ○ | ◎ | ○ | ○ |
| C62 | ○ | ○ | ○ | ○ | ◎ | ◎ | △ | ○ | ○ | ○ |
| C63 | ○ | ○ | ◎ | ◎ | ◎ | ◎ | ◎ | ◎ | ○ | ○ |
| C64 | ○ | ○ | ◎ | ◎ | ◎ | ◎ | ○ | ◎ | ○ | ○ |
| C65 | ○ | ○ | ◎ | ◎ | ◎ | ◎ | ◎ | ◎ | ○ | ○ |
| C66 | ○ | ○ | ○ | ○ | ◎ | ◎ | △ | ○ | ○ | ○ |
| C67 | ○ | ○ | ○ | ○ | ◎ | ◎ | ○ | ◎ | ○ | ○ |
| C68 | ○ | ○ | ◎ | ◎ | ◎ | ◎ | ○ | ◎ | ○ | ○ |
| C69 | ○ | ○ | ○ | ○ | ◎ | ◎ | ○ | ◎ | ○ | ○ |
| C70 | ○ | ○ | ◎ | ◎ | ◎ | ◎ | ◎ | ◎ | △ | △ |
| C71 | ○ | ○ | ○ | ○ | ◎ | ◎ | △ | ○ | ○ | ○ |
| C72 | ○ | ○ | ◎ | ◎ | ◎ | ◎ | ○ | ○ | ○ | ○ |
| C73 | ○ | ○ | ◎ | ◎ | ○ | ○ | ○ | ◎ | △ | △ |
| C74 | ○ | ○ | ◎ | ◎ | ◎ | ◎ | ○ | ○ | ○ | ○ |
| C75 | ○ | ○ | ◎ | ◎ | ◎ | ◎ | △ | ○ | ○ | ○ |
| C76 | ○ | ○ | ◎ | ◎ | ◎ | ◎ | ○ | ◎ | ○ | ○ |
| C77 | ○ | ○ | ◎ | ◎ | ◎ | ◎ | ○ | ◎ | ○ | ○ |
| C78 | ○ | ○ | ◎ | ◎ | ◎ | ◎ | △ | ○ | ○ | ○ |

TABLE 42

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C79 | ○ | ○ | ◎ | ◎ | ◎ | ◎ | ○ | ◎ | ○ | ○ |
| C80 | ○ | ○ | ◎ | ◎ | ◎ | ◎ | ○ | ◎ | △ | △ |
| C81 | ○ | ○ | ◎ | ◎ | ◎ | ◎ | △ | ○ | ○ | ○ |
| C82 | ○ | ○ | ◎ | ◎ | ○ | ○ | ◎ | ◎ | ○ | ○ |
| C83 | ○ | ○ | ◎ | ◎ | ◎ | ◎ | ◎ | ◎ | ○ | ○ |
| C84 | ○ | ○ | ◎ | ◎ | ◎ | ◎ | △ | ○ | ○ | ○ |
| C85 | ○ | ○ | ◎ | ◎ | ◎ | ◎ | ○ | ◎ | ○ | ○ |
| C86 | ○ | ○ | ○ | ○ | ◎ | ◎ | ○ | ◎ | ○ | ○ |
| C87 | ○ | ○ | ◎ | ◎ | ◎ | ◎ | ○ | ◎ | ○ | ○ |
| C88 | ○ | ○ | ◎ | ◎ | ◎ | ◎ | △ | ○ | ○ | ○ |
| C89 | ○ | ○ | ○ | ○ | ◎ | ◎ | ○ | ◎ | ○ | ○ |
| C90 | ○ | ○ | ◎ | ◎ | ◎ | ◎ | ○ | ◎ | ○ | ○ |
| C91 | ○ | ○ | ◎ | ◎ | ◎ | ◎ | △ | ○ | ○ | ○ |
| C92 | ○ | ○ | ◎ | ◎ | ◎ | ◎ | ○ | ◎ | ○ | ○ |
| C93 | ○ | ○ | ○ | ○ | ○ | ○ | ◎ | ◎ | △ | △ |
| C94 | ○ | ○ | ○ | ○ | ○ | ○ | ◎ | ◎ | △ | △ |
| C95 | ○ | ○ | ◎ | ◎ | ◎ | ◎ | △◎ | △◎ | △ | △ |
| C96 | ○ | ○ | ○ | ○ | ○ | ○ | ◎ | ◎ | △ | △ |
| C97 | ○ | ○ | ◎ | ◎ | ◎ | ◎ | ○ | ◎ | ○ | ○ |
| C98 | ○ | ○ | ◎ | ◎ | ○ | ○ | △◎ | ○ | △ | △ |
| C99 | ○ | ○ | ◎ | ◎ | ◎ | ◎ | ○ | ◎ | ○ | ○ |
| C100 | ○ | ○ | ◎ | ◎ | ◎ | ◎ | ○ | ◎ | ○ | ○ |
| C101 | ○ | ○ | ◎ | ◎ | ◎ | ◎ | △◎ | ○ | △ | △ |
| C102 | ○ | ○ | ○ | ○ | ○ | ○ | ○ | ◎ | ○ | ○ |
| C103 | ○ | ○ | ◎ | ◎ | ◎ | ◎ | ○ | ◎ | ○ | ○ |
| C104 | ○ | ○ | ◎ | ◎ | ◎ | ◎ | △ | ○ | ○ | ○ |

TABLE 43

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C105 | ○ | ○ | ○ | ○ | ⊙ | ⊙ | ○ | ⊙ | ○ | ○ |
| C106 | ○ | ○ | ○ | ○ | ⊙ | ⊙ | ○ | ⊙ | ○ | ○ |
| C107 | ○ | ○ | ○ | ○ | ⊙ | ⊙ | ○ | ⊙ | ○ | ○ |
| C108 | ○ | ○ | ○ | ○ | ⊙ | ⊙ | ○ | ⊙ | ○ | ○ |
| C109 | ○ | ○ | ○ | ○ | ⊙ | ⊙ | ○ | ○ | ○ | ○ |
| C110 | ○ | ○ | ⊙ | ⊙ | ⊙ | ⊙ | ⊙ | ⊙ | ○ | ○ |
| C111 | ○ | ○ | ⊙ | ⊙ | ⊙ | ⊙ | ○ | ⊙ | ○ | ○ |
| C112 | ○ | ○ | ⊙ | ⊙ | ⊙ | ⊙ | ○ | ⊙ | ○ | ○ |
| C113 | ○ | ○ | ⊙ | ⊙ | ⊙ | ⊙ | ○ | ⊙ | ○ | ○ |
| C114 | ○ | ○ | ⊙ | ⊙ | ⊙ | ⊙ | ⊙ | ⊙ | ○ | ○ |
| C115 | ○ | ○ | ⊙ | ⊙ | ⊙ | ⊙ | ○ | ⊙ | ○ | ○ |
| C116 | ○ | ○ | ⊙ | ⊙ | ⊙ | ⊙ | ⊙ | ⊙ | ○ | ○ |
| C117 | ○ | ○ | ⊙ | ⊙ | ⊙ | ⊙ | ⊙ | ⊙ | ○ | ○ |
| C118 | ○ | ○ | ⊙ | ⊙ | ⊙ | ⊙ | ⊙ | ⊙ | ○ | ○ |
| C119 | ○ | ○ | ⊙ | ⊙ | ⊙ | ⊙ | ⊙ | ⊙ | ○ | ○ |
| C120 | ○ | ○ | ⊙ | ⊙ | ⊙ | ⊙ | ○ | ⊙ | ○ | ○ |
| C121 | ○ | ○ | ⊙ | ⊙ | ⊙ | ⊙ | ○ | ⊙ | ○ | ○ |
| C122 | ○ | ○ | ⊙ | ⊙ | ⊙ | ⊙ | ○ | ○ | ○ | ○ |
| C123 | ○ | ○ | ⊙ | ⊙ | ⊙ | ⊙ | ○ | ○ | ○ | ○ |
| C124 | ○ | ○ | ⊙ | ⊙ | ⊙ | ⊙ | ○ | ○ | ○ | ○ |
| C125 | ○ | ○ | ○ | ○ | ⊙ | ⊙ | △ | ○ | ○ | ○ |
| C126 | ○ | ○ | ○ | ○ | ⊙ | ⊙ | △ | ○ | ○ | ○ |
| C127 | ○ | ○ | ⊙ | ⊙ | ⊙ | ⊙ | ○ | ⊙ | ○ | ○ |
| C128 | ○ | ○ | ⊙ | ⊙ | ⊙ | ⊙ | ○ | ⊙ | ○ | ○ |
| C129 | ○ | ○ | ⊙ | ⊙ | ⊙ | ⊙ | ○ | ⊙ | ○ | ○ |
| C130 | ○ | ○ | ⊙ | ⊙ | ⊙ | ⊙ | ○ | ⊙ | ○ | ○ |

TABLE 44

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C131 | ○ | ○ | ⊙ | ⊙ | ⊙ | ⊙ | ○ | ⊙ | ○ | ○ |
| C132 | ○ | ○ | ⊙ | ⊙ | ⊙ | ⊙ | ⊙ | ⊙ | ○ | ○ |
| C133 | ○ | ○ | ○ | ○ | ⊙ | ⊙ | ○ | ⊙ | ○ | ○ |
| C134 | ○ | ○ | ○ | ○ | ⊙ | ⊙ | ○ | ⊙ | ○ | ○ |
| C135 | ○ | ○ | ⊙ | ⊙ | ⊙ | ⊙ | ○ | ⊙ | ○ | ○ |
| C136 | ○ | ○ | ⊙ | ⊙ | ⊙ | ⊙ | ○ | ⊙ | ○ | ○ |
| C137 | ○ | ○ | ○ | ○ | ⊙ | ⊙ | ○ | ⊙ | ○ | ○ |
| C138 | ○ | ○ | ○ | ○ | ⊙ | ⊙ | ○ | ⊙ | ○ | ○ |
| C139 | ○ | ○ | ⊙ | ⊙ | ⊙ | ⊙ | ⊙ | ⊙ | ○ | ○ |
| C140 | ○ | ○ | ⊙ | ⊙ | ⊙ | ⊙ | ⊙ | ⊙ | ○ | ○ |
| C141 | ○ | ○ | ⊙ | ⊙ | ⊙ | ⊙ | ○ | ⊙ | ○ | ○ |
| C142 | ○ | ○ | ⊙ | ⊙ | ⊙ | ⊙ | ○ | ⊙ | ○ | ○ |
| C143 | ○ | ○ | ⊙ | ⊙ | ⊙ | ⊙ | ⊙ | ⊙ | ○ | ○ |
| C144 | ○ | ○ | ○ | ○ | ⊙ | ⊙ | ○ | ⊙ | ○ | ○ |
| C145 | ○ | ○ | ○ | ○ | ⊙ | ⊙ | △ | ○ | ○ | ○ |
| C146 | ○ | ○ | ⊙ | ⊙ | ⊙ | ⊙ | ○ | ⊙ | ○ | ○ |
| C147 | ○ | ○ | ○ | ○ | ⊙ | ⊙ | ○ | ⊙ | ○ | ○ |
| C148 | ○ | ○ | ○ | ○ | ○ | ○ | ⊙ | ⊙ | △ | △ |
| C149 | ○ | ○ | ○ | ○ | ○ | ○ | ⊙ | ⊙ | △ | △ |
| C150 | ○ | ○ | ○ | ○ | ⊙ | ⊙ | ⊙ | ⊙ | ○ | ○ |
| C151 | ○ | ○ | ○ | ○ | ○ | ○ | ○ | ⊙ | ○ | ○ |
| C152 | ○ | ○ | ○ | ○ | ⊙ | ⊙ | ○ | ⊙ | ○ | ○ |
| C153 | ○ | ○ | ○ | ○ | ⊙ | ⊙ | ⊙ | ⊙ | ○ | ○ |
| C154 | ○ | ○ | ○ | ○ | ⊙ | ⊙ | ⊙ | ⊙ | ○ | ○ |
| C155 | ○ | ○ | ○ | ○ | ⊙ | ⊙ | △ | ⊙ | ○ | ○ |
| C156 | ○ | ○ | ○ | ○ | ⊙ | ⊙ | ○ | ⊙ | ○ | ○ |

TABLE 45

(Example)

| | Alkali resistance | | Scuff resistance | | Weathering resistance | | Solvent content | | Gasoline resistance | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| C157 | ○ | ○ | ○ | ○ | ◎ | ◎ | ○ | ◎ | ○ | ○ |
| C158 | ○ | ○ | ◎ | ◎ | ○ | ○ | ◎ | ◎ | ○ | ○ |
| C159 | ○ | ○ | ○ | ○ | ○ | ○ | ◎ | ◎ | △ | △ |
| C160 | ○ | ○ | ○ | ○ | ◎ | ◎ | ◎ | ◎ | △ | △ |
| C161 | ○ | ○ | ◎ | ◎ | ○ | ○ | ○ | ◎ | ○ | ○ |
| C162 | ○ | ○ | ○ | ○ | ◎ | ◎ | ◎ | ◎ | ○ | ○ |
| C163 | ○ | ○ | ○ | ○ | ◎ | ◎ | ◎ | ◎ | ○ | ○ |
| C164 | ○ | ○ | ◎ | ◎ | ◎ | ◎ | ○ | ◎ | ○ | ○ |
| C165 | ○ | ○ | ○ | ○ | ◎ | ◎ | ◎ | ◎ | ○ | ○ |
| C166 | ○ | ○ | ○ | ○ | ◎ | ◎ | ○ | ◎ | ○ | ○ |
| C167 | ○ | ○ | ◎ | ◎ | ◎ | ◎ | ○ | ◎ | ○ | ○ |
| C168 | ○ | ○ | ◎ | ◎ | ◎ | ◎ | △ | ○ | ○ | ○ |
| C169 | ○ | ○ | ○ | ○ | ◎ | ◎ | ◎ | ◎ | ○ | ○ |
| C170 | ○ | ○ | ◎ | ◎ | ◎ | ◎ | △ | ○ | ○ | ○ |
| C171 | ○ | ○ | ◎ | ◎ | ◎ | ◎ | △ | △ | ○ | ○ |
| C172 | ○ | ○ | ○ | ○ | ◎ | ◎ | ◎ | ◎ | ○ | ○ |
| C173 | ○ | ○ | ◎ | ◎ | ◎ | ◎ | ◎ | ◎ | ○ | ○ |

TABLE 46

(Comparative Example)

| | Alkali resistance | Scuff resistance | Weathering resistance | Solvent content 25° C. | 60° C. | Gasoline resistance |
|---|---|---|---|---|---|---|
| QC1 | ○ | ◎ | ◎ | X | X | ○ |
| QC2 | ○ | ○ | ◎ | X | X | ○ |
| QC3 | ○ | X | X | X | X | △ |
| QC4 | ○ | X | X | X | △ | △ |
| QC5 | ○ | X | X | X | X | △ |

TABLE 47

(Example)
(2) Intercoating

| | Water resistance | | Adhesive | | Thermal cycling | | Solvent content | | Debonded area by chipping | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| S1 | ○ | ○ | ○ | ○ | ○ | ○ | ◎ | ◎ | △ | △ |
| S2 | ○ | ○ | ○ | ○ | ○ | ○ | △ | ○ | ○ | ○ |
| S3 | ○ | ○ | ○ | ○ | ○ | ○ | △ | ○ | ○ | ○ |
| S4 | ○ | ○ | ○ | ○ | ○ | ○ | ○ | ◎ | △ | △ |
| S5 | ○ | ○ | ○ | ○ | ○ | ○ | ○ | ◎ | ○ | ○ |
| S6 | ○ | ○ | ○ | ○ | ○ | ○ | ◎ | ◎ | ○ | △ |
| S7 | ○ | ○ | ○ | ○ | ○ | ○ | ◎ | ◎ | ○ | ○ |
| S8 | ○ | ○ | ○ | ○ | ○ | ○ | ○ | ○ | ◎ | ◎ |
| S9 | ○ | ○ | ○ | ○ | ○ | ○ | ○ | ◎ | ○ | ◎ |
| S10 | ○ | ○ | ○ | ○ | ○ | ○ | ◎ | ◎ | ○ | ○ |
| S11 | ○ | ○ | ○ | ○ | ○ | ○ | ○ | ◎ | ○ | ○ |
| S12 | ○ | ○ | ○ | ○ | ○ | ○ | ◎ | ◎ | ○ | △ |
| S13 | ○ | ○ | ○ | ○ | ○ | ○ | ○ | ◎ | ○ | ○ |
| S14 | ○ | ○ | ○ | ○ | ○ | ○ | ○ | ○ | ○ | ○ |
| S15 | ○ | ○ | ○ | ○ | ○ | ○ | △ | ○ | ◎ | ◎ |
| S16 | ○ | ○ | ○ | ○ | ○ | ○ | ◎ | ◎ | ○ | △ |
| S17 | ○ | ○ | ○ | ○ | ○ | ○ | △ | △ | ◎ | ◎ |
| S18 | ○ | ○ | ○ | ○ | ○ | ○ | △ | △ | ◎ | ◎ |
| S19 | ○ | ○ | ○ | ○ | ○ | ○ | ○ | ◎ | ○ | ○ |

TABLE 48

(Comparative Example)

| | Water resistance | | Adhesive | | Thermal cycling | | Solvent content | | Debonded area by chipping | |
|---|---|---|---|---|---|---|---|---|---|---|
| | Solvent base | Aqueous base | Solvent base | Aqueous base | Solvent base | Aqueous base | 25° C. | 60° C. | Solvent base | Aqueous base |
| QS1 | ○ | ○ | ○ | ○ | ○ | ○ | X | X | ◎ | ◎ |
| QS2 | ○ | ○ | ○ | ○ | ○ | ○ | X | X | ○ | ○ |
| QS3 | ○ | ○ | ○ | ○ | ○ | ○ | X | X | ○ | ○ |
| QS4 | ○ | ○ | ○ | ○ | ○ | ○ | X | △ | ◎ | ◎ |
| QS5 | ○ | ○ | ○ | ○ | ○ | ○ | X | X | ◎ | ○ |

TABLE 49

(Example)
(3) Solid Color Coating

| | Alkali resistance | Scuff resistance | Weathering resistance | Solvent content | | Gasoline resistance |
|---|---|---|---|---|---|---|
| | | | | 25° C. | 60° C. | |
| T1 | ○ | ○ | ○ | ◎ | ◎ | ○ |
| T2 | ○ | ○ | ◎ | △ | ○ | ○ |
| T3 | ○ | ○ | ◎ | △ | ○ | ○ |
| T4 | ○ | ○ | ◎ | ○ | ◎ | ○ |
| T5 | ○ | ◎ | ○ | ○ | ◎ | △ |
| T6 | ○ | ○ | ○ | ◎ | ◎ | △ |
| T7 | ○ | ○ | ◎ | ◎ | ◎ | ○ |
| T8 | ○ | ◎ | ◎ | ○ | ○ | ○ |
| T9 | ○ | ○ | ◎ | ○ | ◎ | ○ |
| T10 | ○ | ○ | ◎ | ◎ | ◎ | ○ |
| T11 | ○ | ◎ | ◎ | ○ | ◎ | ○ |
| T12 | ○ | ○ | ◎ | ◎ | ◎ | ○ |
| T13 | ○ | ○ | ◎ | ○ | ◎ | ○ |
| T14 | ○ | ◎ | ◎ | ○ | ○ | ○ |
| T15 | ○ | ◎ | ◎ | △ | ○ | ○ |
| T16 | ○ | ◎ | ◎ | ◎ | ◎ | ○ |
| T17 | ○ | ◎ | ◎ | △ | △ | ○ |
| T18 | ○ | ◎ | ◎ | △ | △ | ○ |
| T19 | ○ | ◎ | ◎ | ○ | ◎ | ○ |

TABLE 50

(Comparative Example)

| | Alkali resistance | Scuff resistance | Weathering resistance | Solvent content | | Gasoline resistance |
|---|---|---|---|---|---|---|
| | | | | 25° C. | 60° C. | |
| QT1 | ○ | ◎ | ◎ | X | X | ○ |
| QT2 | ○ | ○ | ◎ | X | X | ○ |
| QT3 | ○ | ○ | ◎ | X | X | ○ |
| QT4 | ○ | ○ | ◎ | X | △ | ○ |
| QT5 | ○ | ◎ | ◎ | X | X | ○ |

TABLE 51

(Example)

| | Water resistance | Adhesive | Thermal cycling | Solvent content | | Debonded area by chipping |
|---|---|---|---|---|---|---|
| | | | | 25° C. | 60° C. | |
| B1 | ○ | ○ | ○ | ○ | ○ | ○ |
| B2 | ○ | ○ | ○ | ○ | ○ | ○ |
| B3 | ○ | ○ | ○ | ○ | ○ | ○ |
| B4 | ○ | ○ | ○ | ○ | ○ | ○ |
| B5 | ○ | ○ | ○ | ○ | ○ | ○ |
| B6 | ○ | ○ | ○ | ○ | ○ | ○ |

TABLE 51-continued (Example)

| | Water resistance | Adhesive | Thermal cycling | Solvent content 25° C. | Solvent content 60° C. | Debonded area by chipping |
|---|---|---|---|---|---|---|
| B7 | ○ | ○ | ○ | ○ | ○ | ○ |
| B8 | ○ | ○ | ○ | ○ | ⊙ | ○ |
| B9 | ○ | ○ | ○ | Δ | ○ | ○ |
| B10 | ○ | ○ | ○ | Δ | Δ | ○ |

TABLE 52

(Comparative Example)

| | Water resistance | Adhesive | Thermal cycling | Solvent content 25° C. | Solvent content 60° C. | Debonded area by chipping |
|---|---|---|---|---|---|---|
| QB1 | ○ | ○ | ○ | X | X | ⊙ |
| QB2 | ○ | ○ | ○ | X | X | ○ |
| QB3 | ○ | ○ | ○ | X | X | ○ |
| QB4 | ○ | ○ | ○ | X | Δ | ⊙ |
| QB5 | ○ | ○ | ○ | X | X | ⊙ |

In view of the above, the present coating composition provides improved coating characteristics such as improved water resistance, adhesive, chipping resistance, alkali resistance, weathering resistance and gasoline resistance, as well as improved coating appearance, even though the organic solvent content is reduced to 40% or lower. In particular, the present coating composition is suitable as a clear coating composition, intercoating composition, solid color coating composition and base coating composition for substrates to be coated, such as automobile bodies. Further, the viscosity of the present coating composition is low. Therefore, the present composition can be coated on the substrate, without causing any sagging and, therefore, can be thickly coated, by coating the present composition on the substrate while the substrate is rotated about a horizontal axis, and then baked or dried.

We claim:

1. A low solvent content resin composition comprising an acrylic oligomer or a polyester oligomer containing an alicyclic epoxy group in a molecule and having a number average molecular weight (Mn) of 300 to 2000, a weight average molecular weight (Mw) of 300 to 4000 and an Mw/Mn ratio of 1 to 2.5, the content of an organic solvent content of the composition being 0 to 40%.

2. The composition of claim 1 wherein said oligomer has an Mn of 600 to 2000, an Mw of 600 to 4000 and an Mw/Mn ratio of 1 to 2.

3. The composition of claim 1 wherein said acrylic oligomer is produced by polymerizing or copolymerizing an acrylic monomer having an alicyclic epoxy group in a molecule.

4. The composition of claim 1 wherein said polyester oligomer is produced by reacting an acrylic monomer having a hydroxyl group and an ester bond with an acid anhydride and an α-olefin epoxide, or with said acid anhydride, an α-olefin epoxide and lactone.

5. The composition of claim 1 wherein said acrylic oligomer has an Mn of 600 to 1800, an Mw of 600 to 3000 and an Mw/Mn ratio of 1 to 2.

6. The composition of claim 1 wherein said oligomer is a polyester oligomer having an Mn of 300 to 1800, an Mw of 300 to 3000, and an Mw/Mn ratio of 1 to 2.

7. The composition of claim 1 wherein said oligomer contains, in a molecule, a functional group selected from the group consisting of a silanol group, a hydrolyzable silyl group, a hydroxyl group and a blocked hydroxyl group, together with an alicyclic epoxy group.

8. The composition of claim 7 wherein said oligomer is selected from the group consisting of an oligomer containing, in a molecule, an alicyclic epoxy group and a silanol group and/or a hydrolyzable silyl group, an oligomer containing, in a molecule, an alicyclic epoxy group and a hydroxyl group and/or a blocked hydroxyl group, and an oligomer containing, in a molecule, an alicyclic epoxy group, a silanol group and/or a hydrolyzable silyl group, and a hydroxyl group and/or a blocked hydroxyl group.

9. The composition of claim 1 wherein said content of an organic solvent is 5 to 30 wt. %.

10. The composition of claim 1 wherein said content of an organic solvent is 5 to 15 wt. %.

11. A low solvent content container composition comprising: (i) an acrylic oligomer or a polyester oligomer containing an alicyclic epoxy group in a molecule and having a number average molecular weight (Mn) of 300 to 2000, a weight average molecular weight (Mw) of 300 to 4000, and an Mw/Mn ratio of 1 to 2.5; and (ii) a cationic polymerization catalyst, the content of an organic solvent being 0 to 40 wt. %.

12. The composition of claim 11, wherein said oligomer had an Mn of 600 to 2000, an Mw of 600 to 4000 and an Mw/Mn ratio of 1 to 2.

13. The composition of claim 15 wherein said acrylic oligomer is produced by polymerizing or copolymerizing an acrylic monomer having an alicyclic epoxy group in a molecule.

14. The composition of claim 11 wherein said polyester oligomer is produced by reacting an acrylic monomer having a hydroxyl group and an ester bond with an acid anhydride and an α-olefin epoxide, or with said acid anhydride, an α-olefin epoxide and lactone.

15. The composition of claim 11 wherein said acrylic oligomer has an Mn of 600 to 1800, an Mw of 600 to 3000 and an Mw/Mn ratio of 1 to 2.

16. The composition of claim 11 wherein said oligomer is a polyester oligomer having an Mn of 300 to 1800, an Mw of 300 to 3000, and an Mw/Mn ratio of 1 to 2.

17. The composition of claim 11 wherein said oligomer contains, in a molecule, a functional group selected from the group consisting of a silanol group, a hydrolyzable silyl group, a hydroxyl group and a blocked hydroxyl group, together with an alicyclic epoxy group.

18. The composition of claim 17 wherein said oligomer is selected from the group consisting of an oligomer containing, in a molecule, an alicyclic epoxy group and a silanol group and/or a hydrolyzable silyl group, an oligomer containing, in a molecule, an alicyclic epoxy group and a hydroxyl group and/or a blocked hydroxyl group, and an oligomer containing, in a molecule, an alicyclic epoxy group, a silanol group and/or a hydrolyzable silyl group, and a hydroxyl group and/or a blocked hydroxyl group.

19. The composition of claim 11 wherein said cationic polymerization is selected from the group consisting of an organometallic chelate, an organometallic alcoholate, a protonic acid or a protonic acid neutralized with a Lewis base, a Lewis acid or a Lewis acid neutralized with a Lewis base, an ester of sulfonic acid, an ester of phosphoric acid, and an onium salt.

20. The composition of claim 11 wherein the content of an organic solvent is 5 to 35 wt. %.

21. The composition of claim 11 wherein the content of an organic solvent is 5 to 30 wt. %.

22. The composition of claim 11 which is used as a clear coating composition, a solid color coating composition, an intercoating composition or a base coating composition, for an automobile.

23. A method for coating a low solvent content coating composition comprising (i) an acrylic oligomer a polyester oligomer containing an alicyclic epoxy group in a molecule and having a number average molecular weight (Mn) of 300 to 2000, a weight average molecular weight (Mw) of 300 to 4000, and an Mw/Mn ratio of 1 to 2.5 and (ii) a cationic polymerization catalyst, and having the content of an organic solvent of 0 to 40 wt. %, said method comprising steps of:

coating said coating composition on the surface of a substrate; and then curing said composition by heat, to form a coating on said surface.

24. A low solvent content coating composition comprising:

(i) an acrylic oligomer containing an alicyclic epoxy group in a molecule together with one group selected from the group consisting of a silanol group, a hydrolyzable silyl group, a hydroxyl group and a blocked hydroxyl group, and having a number average molecular weight (Mn) of 700 to 1800, a weight average molecular weight (Mw) of 600 to 3000, and an Mw/Mn ratio of 1 to 1.8; and (ii) a cationic polymerization catalyst;

the content of an organic solvent being 0 to 40 wt. %.

25. The coating composition of claim 24 wherein the content of the organic solvent is 5 to 30 wt. %.

26. The coating composition of claim 24 wherein the number of an alicyclic epoxy group per one molecule of the oligomer is 2–5.

27. A low solvent content coating composition comprising:

an acrylic oligomer containing 2 to 5 alicyclic epoxy groups in a molecule, together with one group selected from the group consisting of a silanol group, a hydrolyzable silyl group, a hydroxyl group and a blocked hydroxyl group, and having a number average molecular weight (Mn) of 600 to 2000, a weight average molecular weight (Mw) of 600 to 4000, and an Mw/Mn ratio of 1.0 to 2.5; and the content of an organic solvent being 0 to 40 wt. %.

28. The coating composition of claim 27, wherein said acrylic oligomer has only said alicyclic epoxy groups, said oligomer has an Mn of 600 to 1800, an Mw of 600 to 3000 and an Mw/Mn of 1.0 to 1.8, and the content of the organic solvent is 5 to 35 wt. % based on the total composition.

* * * * *